(12) United States Patent
Cotton

(10) Patent No.: US 7,969,308 B2
(45) Date of Patent: Jun. 28, 2011

(54) SEAL ARRANGEMENT

(76) Inventor: Martin Cotton, Letchworth Garden City (GB)

( * ) Notice: Subject to any disclaimer, the term of this patent is extended or adjusted under 35 U.S.C. 154(b) by 681 days.

(21) Appl. No.: 11/573,587

(22) PCT Filed: Aug. 12, 2005

(86) PCT No.: PCT/GB2005/003182
§ 371 (c)(1),
(2), (4) Date: Jun. 16, 2008

(87) PCT Pub. No.: WO2006/016184
PCT Pub. Date: Feb. 16, 2006

(65) Prior Publication Data
US 2008/0258401 A1 Oct. 23, 2008

(30) Foreign Application Priority Data

Aug. 12, 2004 (GB) .................................. 0418011.3

(51) Int. Cl.
*G08B 13/14* (2006.01)
(52) U.S. Cl. ............... 340/572.1; 340/539.1; 340/568.1; 340/825.69
(58) Field of Classification Search .... 340/572.1–572.9, 340/5.52, 539.1, 568.1, 568.2, 568.3, 568.8, 340/578, 571, 825.69
See application file for complete search history.

(56) References Cited

U.S. PATENT DOCUMENTS

| 4,381,840 | A | 5/1983 | Ostrowsky |
| 4,598,837 | A * | 7/1986 | Kreiseder et al. ............. 220/253 |
| 4,930,646 | A | 6/1990 | Emslander |
| 5,572,226 | A | 11/1996 | Tuttle |
| 5,635,917 | A | 6/1997 | Todman |
| 6,271,753 | B1 | 8/2001 | Shukla |
| 6,351,985 | B1 * | 3/2002 | Bedwell ........................ 73/49.8 |
| 6,941,796 | B2 * | 9/2005 | Bennett ......................... 73/49.3 |
| 7,258,770 | B2 * | 8/2007 | Weyl et al. ..................... 204/424 |
| 2002/0067264 | A1 | 6/2002 | Soehnlen |
| 2002/0185544 | A1 | 12/2002 | Baillod et al. |
| 2003/0061705 | A1 | 4/2003 | Smeyak et al. |
| 2003/0098287 | A1 | 5/2003 | Taber et al. |
| 2005/0051624 | A1 * | 3/2005 | Kipp et al. .................... 235/385 |

FOREIGN PATENT DOCUMENTS

| DE | 4217254 | 12/1993 |
| WO | WO 03/033373 | 4/2003 |

* cited by examiner

*Primary Examiner* — Daniel Previl
(74) *Attorney, Agent, or Firm* — Gardner Groff Greenwald & Villanueva, PC

(57) ABSTRACT

A seal arrangement having monitoring means and a seal portion. The monitoring means includes means for determining the integrity of the seal portion, the determining means being arranged to deliver a signal to radio frequency identification (RFID) means for producing an output signal in response to the integrity of the seal portion as determined by the means for determining. The present invention also provides a container, a pipe section, a pipeline and a closure member provided with such a seal arrangement.

69 Claims, 16 Drawing Sheets

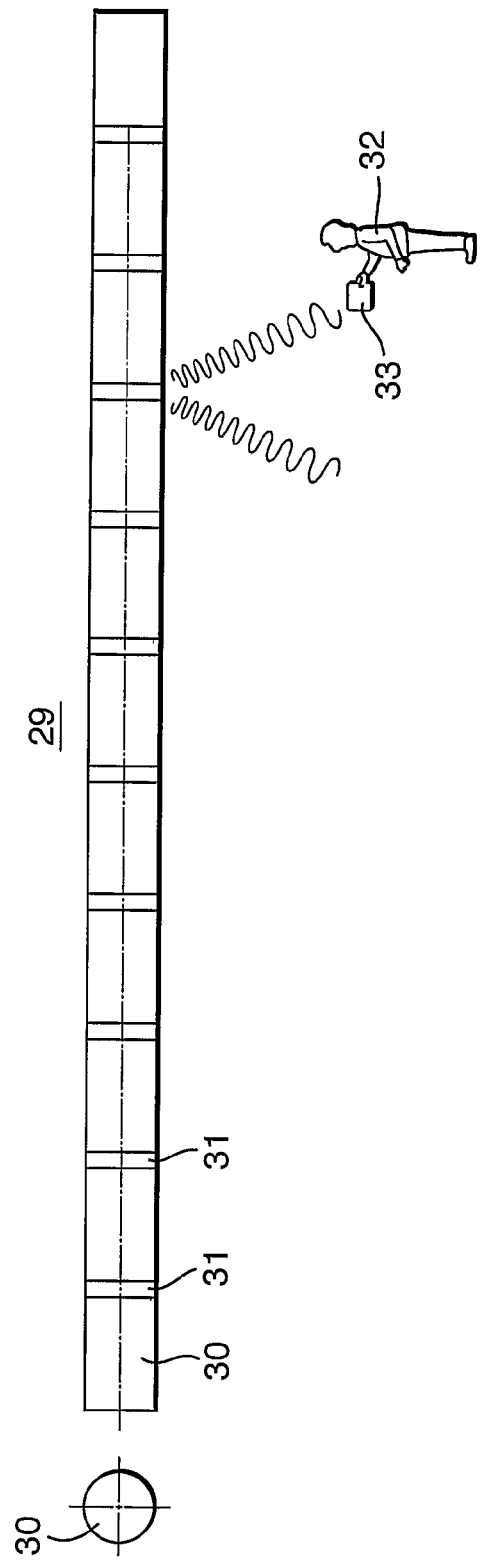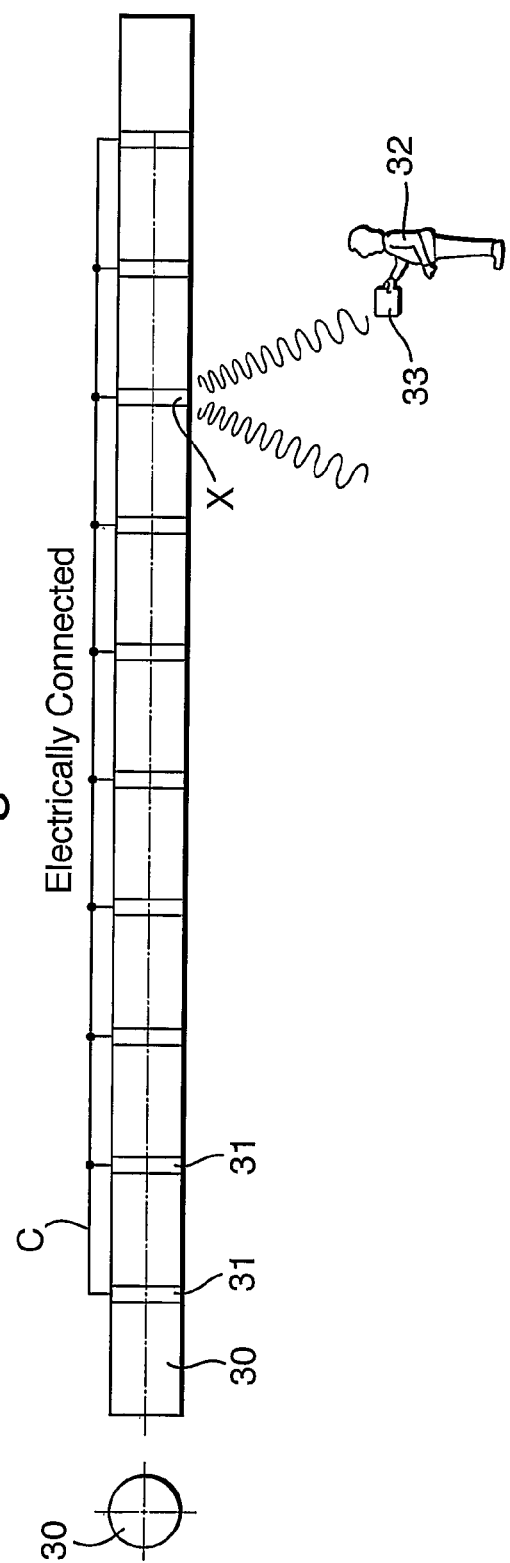

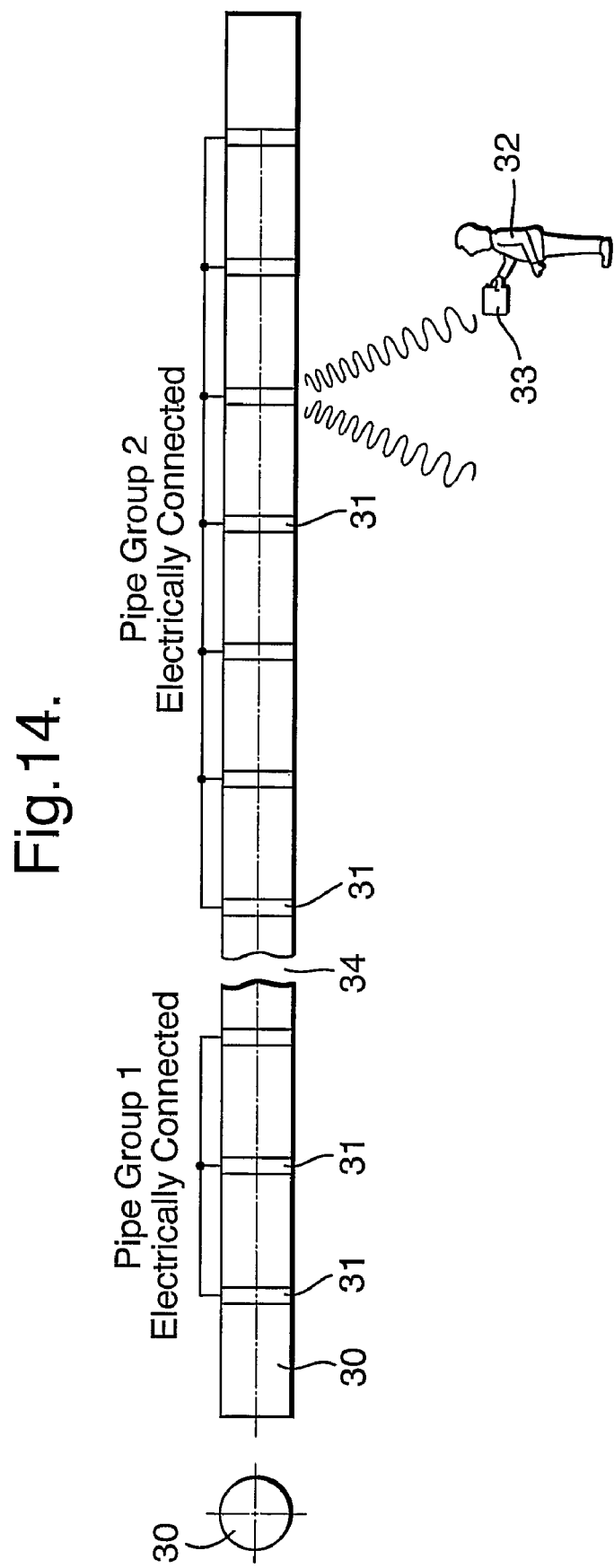

SEAL ARRANGEMENT

The present invention relates to a seal arrangement and, in particular, a seal arrangement for verifying the integrity of a seal.

Seals are provided in a wide variety of situations (for example, in food produce containers, in industrial processes and systems, such as pipelines or sealed fluid vessels between containers) and in a wide variety of configurations and sizes. It is always generally important however to be able to verify the integrity of the seal.

For example, tamper proof lids on food produce containers, or jars, are currently known which comprise a "button" in the lid which "pops-up" to indicate that the seal of the jar has been tampered with.

A reduced pressure within the jar retains the button in a depressed condition from which it is released by a combination of its resilience and an increase in pressure within the jar, for example, at the time of opening (i.e. tampering).

Such "pop-up" lids require human intervention to determine if the article has been tampered with, e.g. by pressing the button on the lid. If the button is in the raised state, it will be depressible when inspected, thus indicating that the jar has been tampered with. However, if no tampering has occurred, the button will not have "popped-up" and so will not depress under inspection.

Where it is necessary to determine the integrity of a large number of food jars, e.g. by way of a human inspector pressing the button on each food jar, the process is time consuming and cannot completely eliminate the element of human error. For instance, a product can reach the shelves of the supermarket and evidence of tampering is sometimes only found by a customer when selecting the product from the supermarket shelf, or worse, when the customer has purchased the product and only notices that it has been tampered with when they are about to use the product. Consumers who find themselves in the above situations are likely to lose faith in the company who produced the product and/or lose faith in the supermarket that sold the product, and in extreme cases, may consider taking legal action against the producer/supermarket.

In the process of "stock-taking" (inventory), it is known to scan bar-codes provided on the packaging of products in order to compile a list of products which are held in, for example, a warehouse. However, it is often the case that during transport the barcode located on the product packaging is damaged or becomes illegible, thereby preventing a bar-code scanner device from reading the bar-code and identifying the product. Further, the bar-code may not have been printed correctly due to an error in the printing stage of the product packaging. Both of the above instances introduce errors into a "stock-taking" process.

The present invention seeks to provide for a seal arrangement having advantages over known such seals.

According to one aspect of the present invention, there is provided a seal arrangement comprising monitoring means and a seal portion, said monitoring means comprising at least one means for determining the integrity of said seal portion, said determining means being arranged to provide a signal for at least one radio frequency identification (RFID) means for producing an output signal in response to the integrity of the seal portion as determined by the said means for determining.

Advantageously, said monitoring means further comprises the said at least one radio frequency identification (RFID) means for producing an output signal in response to the integrity of the seal portion as determined by the said means for determining.

Preferably, said at least one RFID means is arranged to transmit a signal indicative of the integrity of said seal in response to interrogation from a reader device.

Alternatively, said at least one RFID means is arranged to transmit a signal indicative of the integrity of said article continuously without external interrogation.

Conveniently, said at least one RFID means is arranged to transmit a signal containing data identifying the seal arrangement.

Also, said at least one determining means further comprises at least one detection means.

Preferably, said monitoring means is embedded within said seal portion.

Further, said monitoring means comprises at least one external link means coupled to said at least one RFID means.

In particular, at least one of said at least one external link means are further coupled to said at least one determining means.

Also, said at least one external link means are each operable for coupling to an external device.

Advantageously, said at least one RFID means are operable in an active mode and/or a passive mode.

Preferably, said seal portion is formed as a sheet-like member.

Conveniently, said sheet-like member is formed with an aperture.

Further, said sheet-like member is an annulus.

Alternatively, said sheet-like member is formed as a disc.

Further, said at least one of said at least one detection means comprises a frangible material provided on a surface of said seal portion, said frangible material being arranged to break if the seal is tampered with.

Preferably, said frangible portion comprises at least one track of conductive material arranged to form one or more separate circuits, and where said at least one track of conductive material are arranged in concentric rings.

Also, said frangible portion comprises one or more membranes arranged parallel with one another.

Advantageously, said at least one detection means comprise discrete components mounted upon said seal portion.

Alternatively, said at least one detection means are mounted on a flat-section of said sheet-like member.

In a further alternative, said at least one detection means are mounted on a side surface of said sheet-like member.

Preferably, when said frangible portion is broken, said at least one detection means are arranged to no longer output a signal to said at least one determining means, and said at least one determining means determine that the seal has been tampered with.

Alternatively, when said frangible portion is broken, said at least one detection means are arranged to output a signal to said at least one determining means, and said at least one determining means determine that the seal has been tampered with.

In a further alternative, when said frangible portion is broken, said at least one detection means are arranged to output a signal which is different to a normal signal to said at least one determining means, and said at least one determining means determine that the seal has been tampered with.

Preferably, at least one of said at least one detection means comprise a gas sensor for detecting the presence of unwanted gases in the vicinity of said seal.

Further, at least one of said at least one detection means comprise a temperature sensor for detecting changes in temperature in the vicinity of said seal.

Also, at least one of said at least one detection means comprise a radiation sensor for detecting if said seal has been subject to radiation.

In particular, at least one of said at least one detection means comprise a sensor arranged to detect for physical changes in the seal brought about by physical changes in a product stored in the vicinity of said seal.

If required, at least one of said at least one detection means comprise a sensor arranged to detect for chemical changes in the seal brought about by chemical changes in a product stored in the vicinity of said seal.

Advantageously, at least one of said at least one detection means comprise a sensor arranged to detect for biological changes in the seal brought about by biological changes in a product stored in the vicinity of said seal.

Preferably, at least one of said at least one detection means comprise a detector which is arranged to detect changes in the voltage of a circuit formed by said detector means.

Also, at least one of said at least one detection means comprise a detector which is arranged to detect changes in the resistance of a circuit formed by said detector means.

In particular, at least one of said at least one detection means comprise a detector which is arranged to detect changes in the current of a circuit formed by said detector means.

Also, at least one of said at least one detection means comprise a detector which is arranged to detect changes in the capacitance of a circuit formed by said detector means.

Preferably, at least one of said at least one detection means comprise a detector which is arranged to detect changes in the inductance of a circuit formed by said detector means.

Advantageously, at least one of said at least one detection means comprise a detector which is arranged to detect changes in the electromagnetic interference of a circuit formed by said detector means.

Further, at least one of said at least one detection means comprise a detector which is arranged to detect changes in the magnetic field of a circuit formed by said detector means.

Also, at least one of said at least one detection means comprise a sensor for detecting if said seal has been deflected.

In particular, at least one of said at least one detection means comprise a sensor for detecting if said seal has been stretched.

Preferably, at least one of said at least one detection means comprise a sensor for detecting if said seal has suffered shrinkage.

Also, at least one of said at least one detection means comprise a sensor for detecting if said seal has expanded.

Further, at least one of said at least one detection means comprise a sensor for detecting if said seal has contracted.

Also, at least one of said at least one detection means can comprise a sensor for detecting if the position or orientation of said seal has changed relative to a reference point.

Advantageously, the components of said monitoring means are provided on a single package.

Alternatively, the components of said monitoring means are provided on a plurality of packages and said packages are interlinked by means allowing communication between said components.

Conveniently, said package(s) comprise laminates, and said laminates are preferably printed circuits.

Further, each of said at least one RFID means is arranged to perform a specific function, and said specific function can differ from that of each of the other said RFID means.

Also, said at least one RFID means can comprise corresponding transceiver antennae.

In particular, said transceiver antennae can operate at different frequencies to avoid interfering with each other.

Advantageously, said seal portion is formed entirely of material forming said detector means.

Conveniently, said seal arrangement is a gasket member.

Preferably, said transceiver antennae comprise dipole aerials.

According to a further aspect of the present invention, there is provided a container comprising:
a main body for storing a product and having an opening to allow access to said product;
a closure member for covering said opening and arranged to be moveable between an open position and a closed position; and
a seal arrangement as described above and arranged such that when said closure is in said closed position, said seal is located between said main body and said closure member.

Preferably, said seal arrangement is attached to said closure means by securing means.

Further, said securing means comprises an adhesive.

Alternatively, said securing means comprises mechanical means.

Conveniently, said mechanical means comprise pins.

Alternatively, said seal arrangement is held in place between said main body and said closure means by means of the forces exerted by the main body on the closure means and vice versa.

Also, said container is further provided with a gasket arranged for location between said seal arrangement and said main body when said closure means is in said closed position.

In particular, said seal arrangement is embedded in said closure means.

Alternatively, said seal arrangement is formed in the material of the closure means.

According to a yet further aspect of the present invention, there is provided a pipe section for use in a pipeline comprised of a plurality of connected pipe sections, said pipe section comprising a seal arrangement as described above mounted at one end thereof.

According to a further aspect of the present invention, there is provided a pipeline comprising a plurality of connected pipe sections as described above, wherein said seal arrangements are coupled to each other by electronic means.

According to a further aspect of the present invention, there is provided a pipeline comprising a plurality of connected pipe sections as described above, wherein said seal arrangements are coupled to each other by optical means.

Preferably, the seal arrangements are coupled to each other by a combination of electronic and optical means.

Advantageously, the seal arrangements in a first section of pipeline comprising at least one pipe section are linked to the seal arrangements in a second section of pipeline comprising at least one pipe section by a radio link.

According to a further aspect of the present invention, there is provided a closure means for engagement with a container, said closure means comprising means for engaging with said container and a seal arrangement as described above embedded within said closure means.

According to a further aspect of the present invention, there is provided a closure means for engagement with a container, said closure means comprising means for engaging with said container and a seal arrangement as described above in the material of the closure means.

The present invention is described further hereinafter, by way of example only, with reference to the accompanying drawings in which:

FIG. 12 illustrates a pipeline incorporating a seal arrangement in a tenth embodiment;

FIG. 13 illustrates a pipeline incorporating a seal arrangement in an eleventh embodiment;

FIG. 14 illustrates a pipeline incorporating a seal arrangement in a twelfth embodiment;

Figure 1:
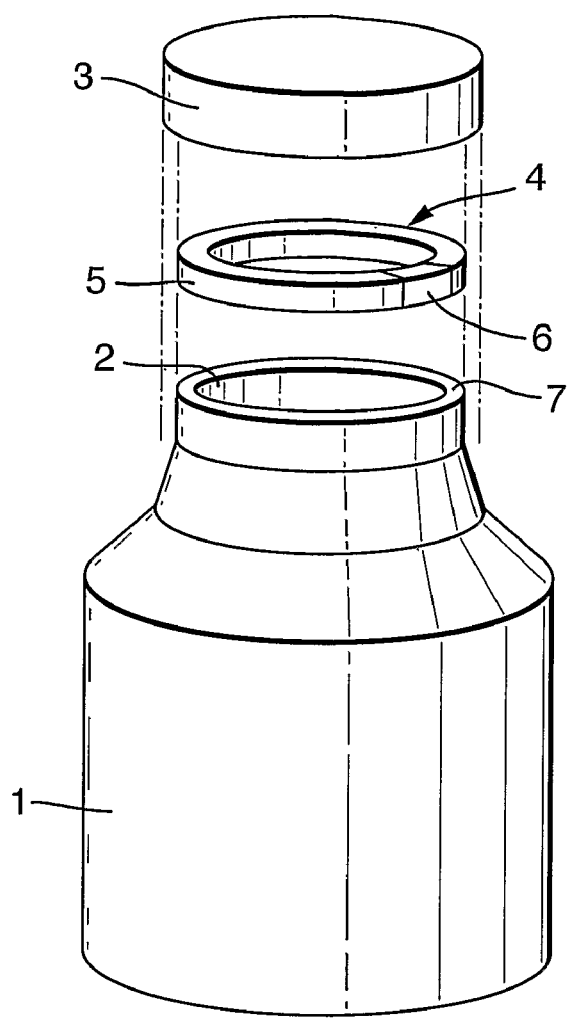
FIG. 1 illustrates an exploded view of a container incorporating a seal arrangement in a first embodiment.

As mentioned, FIG. 1 illustrates a container 1 for storing a product (e.g. foodstuffs, pharmaceutical goods or other perishable goods) and which container has an opening 2 for accessing the product stored within the container 1. The container is sealed by means of a lid 3 arranged to cover said opening 2. The lid 3 is removable in order to gain access to the stored product, but also allows resealing of the container 1 in order to keep the product fresh. In this embodiment, the lid 3 is provided with threaded means (not shown) for engagement with similar threaded means (not shown) provided on said container 1.

This Figure also shows a seal arrangement 4 which is arranged to fit between the opening 2 of said container 1 and the lid 3 when the container 1 is in the sealed condition (i.e. when the lid 3 is in place over the opening 2 of the container 1).

Seal arrangement 4 comprises an annular ring-seal 5 and a monitoring unit 6. The circumference of said ring-seal 5 is such that the ring-seal 5 fits within the internal circumference of said lid 3. The seal arrangement 4 acts as a seal between the lid 3 and container 1 and is arranged to monitor the condition of the seal between the lid 3, seal arrangement 4 and the container 1.

During a production process, the container 1 is first filled with a product, then the seal arrangement 4 is placed such that the ring-seal 5 is in alignment with the peripheral edge 7 of the opening 2 of the container 1. Finally, the container 1 is sealed when the lid 3 is attached to the container 1 thereby trapping the seal arrangement 4 between the peripheral edge 7 of opening and the lid 3 with the seal arrangement 4 serving as a seal between the two.

When the lid 3 is removed from the container, the seal arrangement 4 is arranged to detect such removal. The seal arrangement 4 is arranged for communication with a reader device (not shown) which is operable to "interrogate" the detection unit 4 to determine the integrity of the seal between container 1 and lid 3.

Ideally, the seal will remain intact from the time of initial sealing of the container 1 in a factory, to the time when a user wishes to use the product stored within the container 1. However, it is sometimes the case that the integrity of the seal is compromised either accidentally (e.g. during transport), or by individuals who tamper with the container or by degrading of the product stored within the container. Therefore when the lid 3 is unscrewed from the container 1 (even if the lid 3 is only partially unscrewed), the integrity of the seal is compromised, and the seal arrangement 4 detects such loss of integrity.

Therefore, when "interrogated" by a reader device (not shown), the seal arrangement 4 transmits the data relating to the integrity of the seal to the reader device. Upon reception of the results at the reader device, a user can decide the further action to be taken (e.g. disposing of said container 1 and its contents if the seal is compromised, or taking no further action if the seal is still intact).

In this embodiment the seal arrangement 4 operates in a "passive" mode (i.e. the seal arrangement 4 does not possess its own power source) and only transmits data when "interrogated" by said reader device. However, the seal arrangement 4 may operate in an "active" mode, i.e. the seal arrangement 4 is incorporated into a container with a power source. The seal arrangement 4 may also operate in a "semi-active" mode where the container (and therefore the seal arrangement) is located within range of a "fixed" reader device which provides continuous power to the seal arrangement. In both the "active" and "semi-active" modes, the continuous powering of the seal arrangement allows said self-monitoring seal to continuously transmit data relating to the integrity of the seal.

Figure 2:
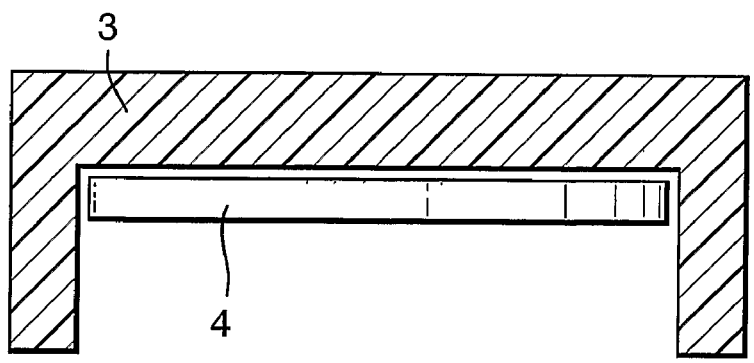
FIG. 2 illustrates a cross-sectional side view of a lid and seal arrangement of FIG. 1.

In FIG. 2, the seal arrangement 4 is shown in its normal position adjacent the lid 3.

Figure 3A:
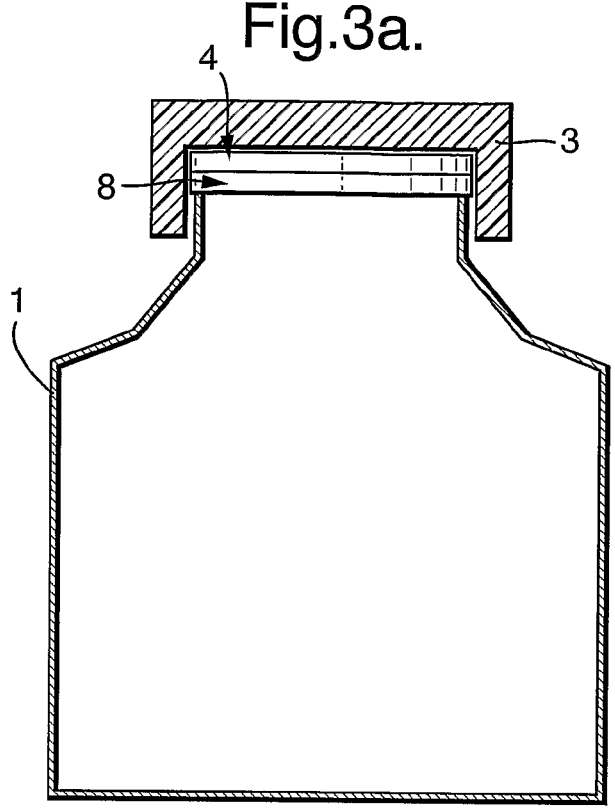
FIG. 3A illustrates a cross-sectional side view of the container of FIG. 1 with a lid in a closed condition.

Turning now to FIG. 3A, which shows container 1, lid 3 and seal arrangement 4 in a "sealed" condition. The seal arrangement 4 is attached to said container 1 by a connecting substance 8. The seal arrangement 4 is also connected to lid 3 by adhesive means (not shown). The strength of the bond formed by the adhesive means (not shown) joining the lid 3 and the seal arrangement 4, is greater than the strength of the bond formed by the connecting substance 8 joining the seal arrangement 4 and the container 1.

On the surface of the seal arrangement 4 which is adjacent the connecting substrate 8 is a detector (not shown). The detector is formed from a thin-film of conducting material which is sandwiched between the seal arrangement 4 and the connecting substrate 8.

When the lid 3 is removed from container 1, the respective strengths of the above mentioned bonds are such that the bond formed by the connecting substance 8 will break before the bond formed by the adhesive means. This results in the seal arrangement 4 being removed from the container 1 with the lid 3.

Figure 3B:
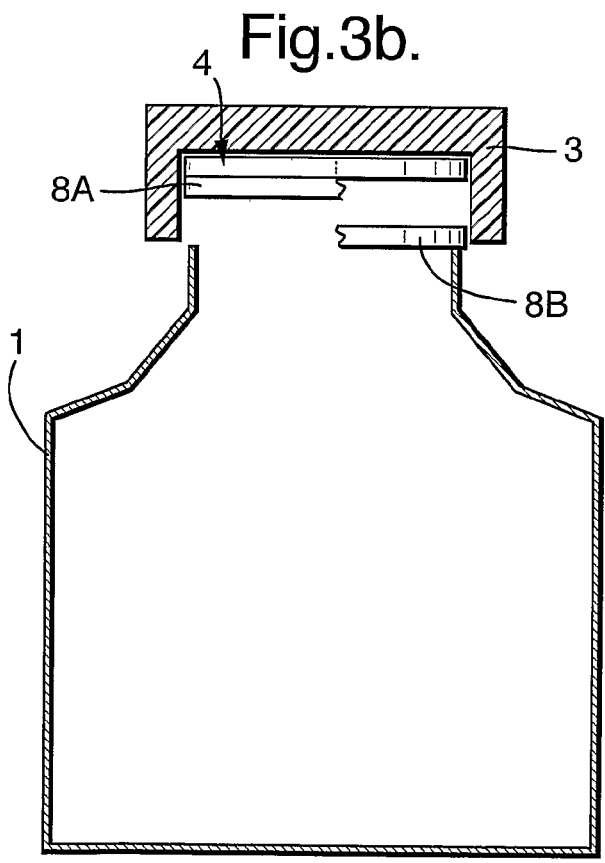
FIG. 3B illustrates a cross-sectional side view of the container of FIG. 1 with the lid in an opened condition.

Part of the connecting substance 8 remains attached to the container 1, and the other part of the connecting substance 8 remains attached to the seal arrangement 4. Such a scenario is illustrated in FIG. 3B, where a first part of the connecting substance 8A is shown attached to the seal arrangement 4 and a second part of the connecting substance 8B is shown attached to the container 1. Due to the frangible nature of the detection means, when the seal is broken, the detector breaks (i.e. because part of it is sandwiched between the connecting substance 8A and the seal arrangement 4, and the other part remains attached to the connecting substance 8B) and is no longer forms a circuit.

The seal arrangement 4 is arranged to detect for such breakage of the detector when the seal between lid 3, seal arrangement 4 and container 1 is broken.

In this embodiment, the monitoring unit (not shown) is arranged, when powered, to monitor the state of the detector.

When the seal is broken, and therefore when the detector is broken, the monitoring unit does not, at first, detect the break in the detector because no power is provided to the detector. It is only at some later time, i.e. when the monitoring unit is interrogated, and therefore receives power, that the monitoring unit detects the break in the detector and transmits such information to the reader device.

It will be appreciated that the location of the adhesive means and the connecting substrate 7 can be reversed such that the seal arrangement 4 remains attached to the container 1 when the seal is broken.

Figure 4:
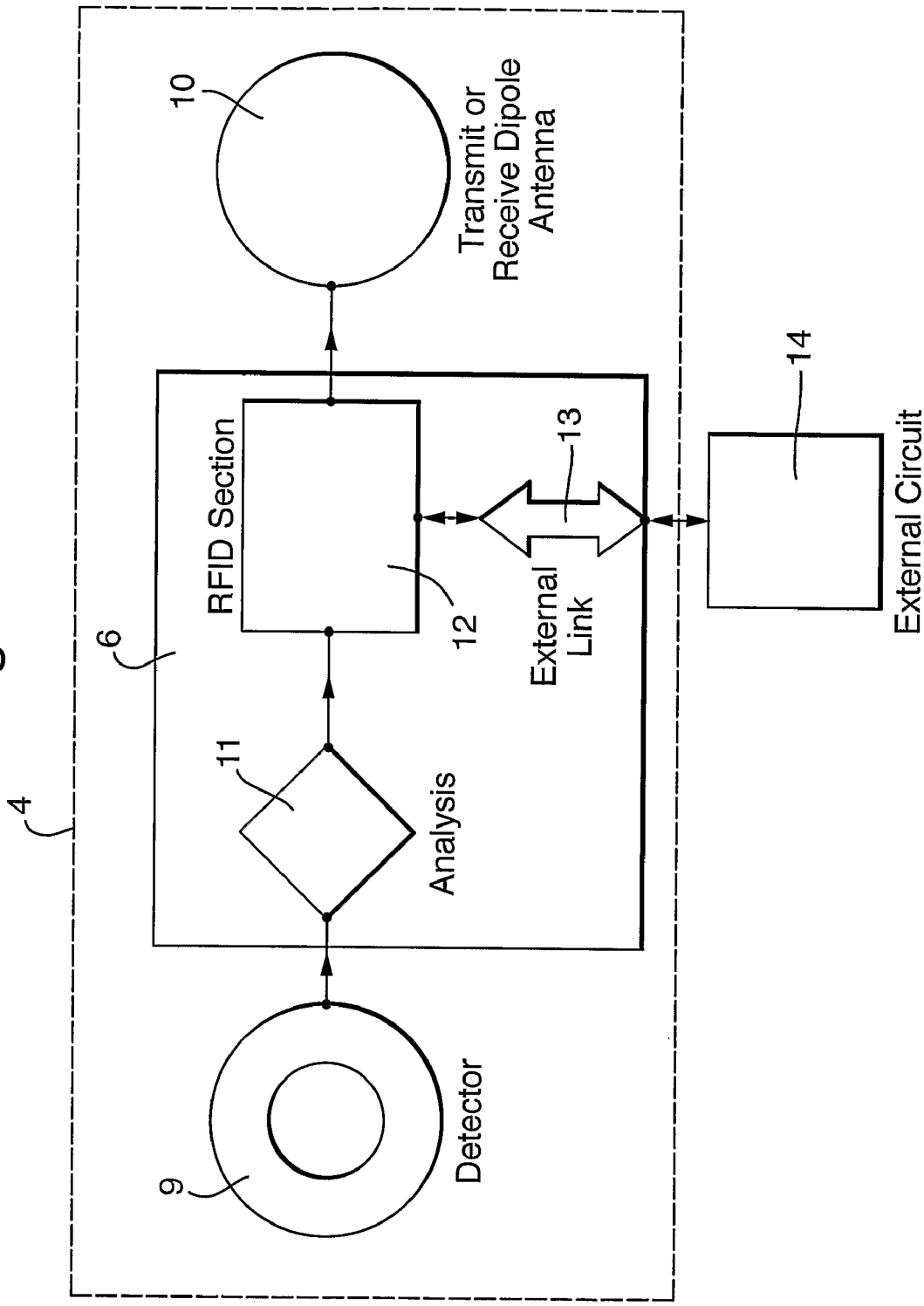
FIG. 4 illustrates a schematic block diagram of the seal arrangement of FIG. 1 in a broadly illustrated example.

FIG. 4 is a schematic view of the seal arrangement 4, and the elements from which the seal arrangement 4 is formed, in a broadly illustrated example.

Detector 9 is an electrically conducting ring formed from a thin-film of material which is coupled to monitoring unit 6. A transceiver antenna 10 is also coupled to said monitoring unit 6 and is arranged to send signals relating to the integrity of the seal to a reader device in response to "interrogation" by said reader device. The transceiver antenna 10 is also arranged to receive "interrogation" signals from said reader device.

In the present embodiment, the seal arrangement 4 is arranged to operate in a "passive" mode, i.e. the seal arrangement 4 does not comprise its own source of power and relies upon the reader device to obtain power (such a method is well-known in the field of radio frequency identification devices). The power to operate the seal arrangement 4 is received from the reader device via transmitter 10. The remaining discussion of this embodiment refers to the system in a "powered" state (i.e. when being "interrogated" by said reader). However, such actions which are described do not take place until "interrogation" occurs and the system has power.

The monitoring unit 6 comprises an analysis section 11, a radio frequency identification (RFID) section 12 and, optionally, an external link section 13, and can comprise an electronics platform or silicon package The analysis section 11 is arranged to send signals to said detector 9 and receive signals from detector 9 and is also arranged to detect for differences between a signal sent to the detector 9 and a corresponding signal received from the detector 9. Any change in the signal received by the analysis section indicates a break in the detector 9, and therefore a break in the seal. Of course, in an alternative arrangement, a change in the signal may indicate that there is no break in the detector 9, and a signal that remains unchanged would indicate that the detector 9 is broken.

When the analysis section 11 receives a signal from the detector 9 it analyses the input data and passes the results of the analysis to the RFID section 12 which then passes the results to the transceiver antenna 10 for transmission to the reader device.

Radio frequency identification (RFID) is well-known in the art, and no further explanation will be given here.

In the above embodiment, the RFID section operates in a passive mode, but could alternatively operate in an active mode. In the active mode, the RFID section has its own power source and is able to transmit continuously.

The Figure also shows an external link device 13 provided in said monitoring unit 6 and coupled to the RFID section 12. The external link device 13 provides a port to which external circuits can be attached and may be an optical link or electronic link.

Also shown is an external circuit 14 attached to said external link device 13. The external circuit 14 is arranged to communicate with the RFID section 12 via the external link device 13. Further, the external link device 13 allows data or information to be uploaded from the RFID section 12 to the external circuit 14, or downloaded from the external circuit 14 to the RFID section 12. Such downloading of data or information is, for example, the downloading of new/upgraded software to the analysis section 11 via the external link device 13, and RFID section 12.

Figure 5:
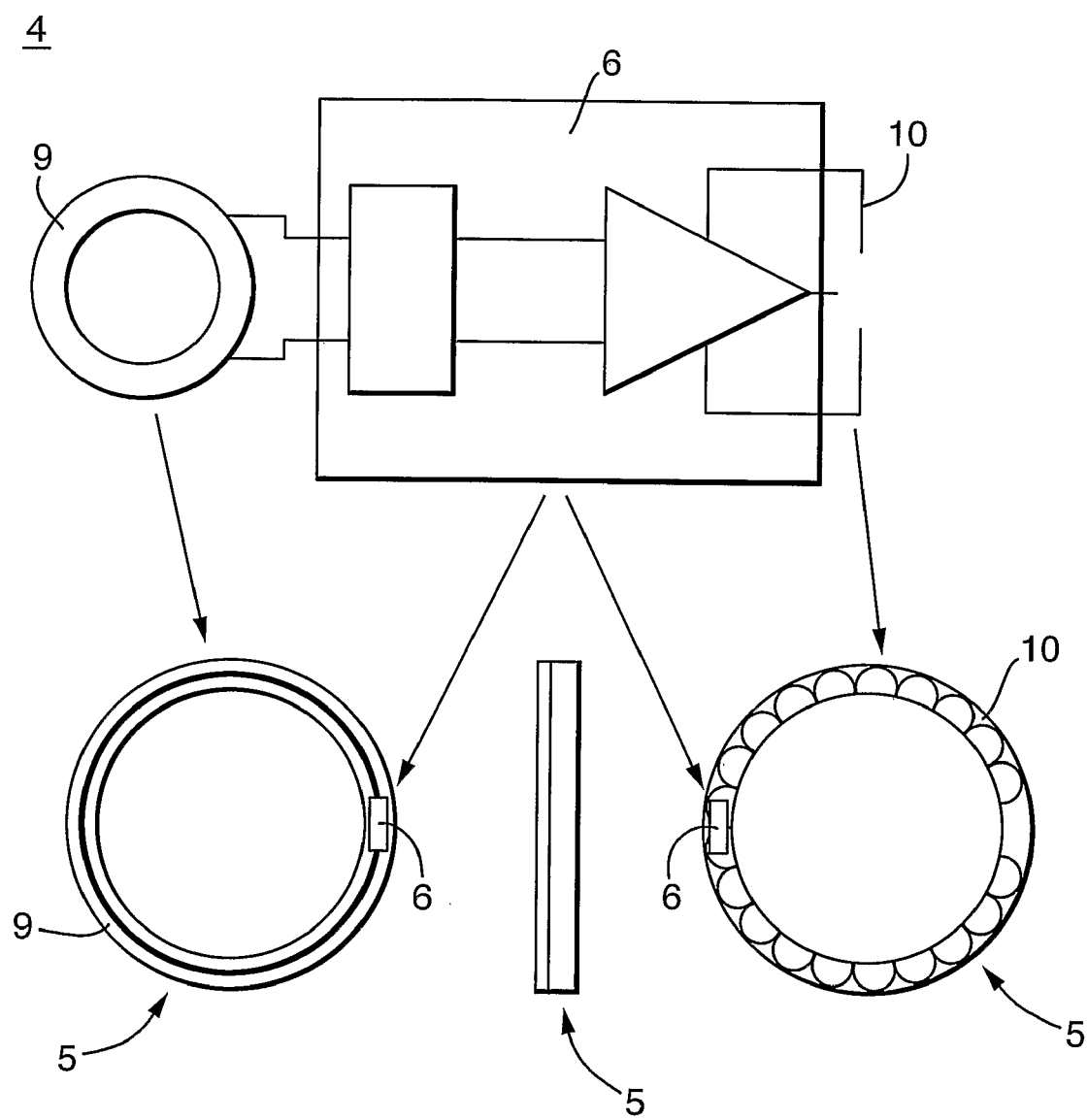
FIG. 5 illustrates a partial schematic diagram of the seal arrangement of FIG. 1 alongside plan, reverse plan and cross-sectional views of said seal arrangement.

FIG. 5 illustrates the physical implementation of the seal arrangement 4 of the present embodiment alongside a partial schematic block diagram of the seal arrangement 4.

The seal arrangement 4 (shown in plan view, side view and reverse plan view) clearly indicates the ring seal 5, the monitoring unit 6, the detector 9 and the transceiver antenna 10. The detector 9 forms a loop on one flat surface of the ring seal 5 (plan view) and the transceiver antenna 9 is formed on an opposite flat surface of the ring seal 5 (reverse plan view). The monitoring unit 6 is located in the body of the ring seal 5 and extends in both directions through the body of the ring seal 5 such that the ends of the monitoring unit 6 are level with the flat surfaces of said ring seal 5 on either side, thereby allowing coupling of the monitoring unit 6 to the detector 9 on one side, and to the transceiver antenna 10 on the other side.

Figure 6:
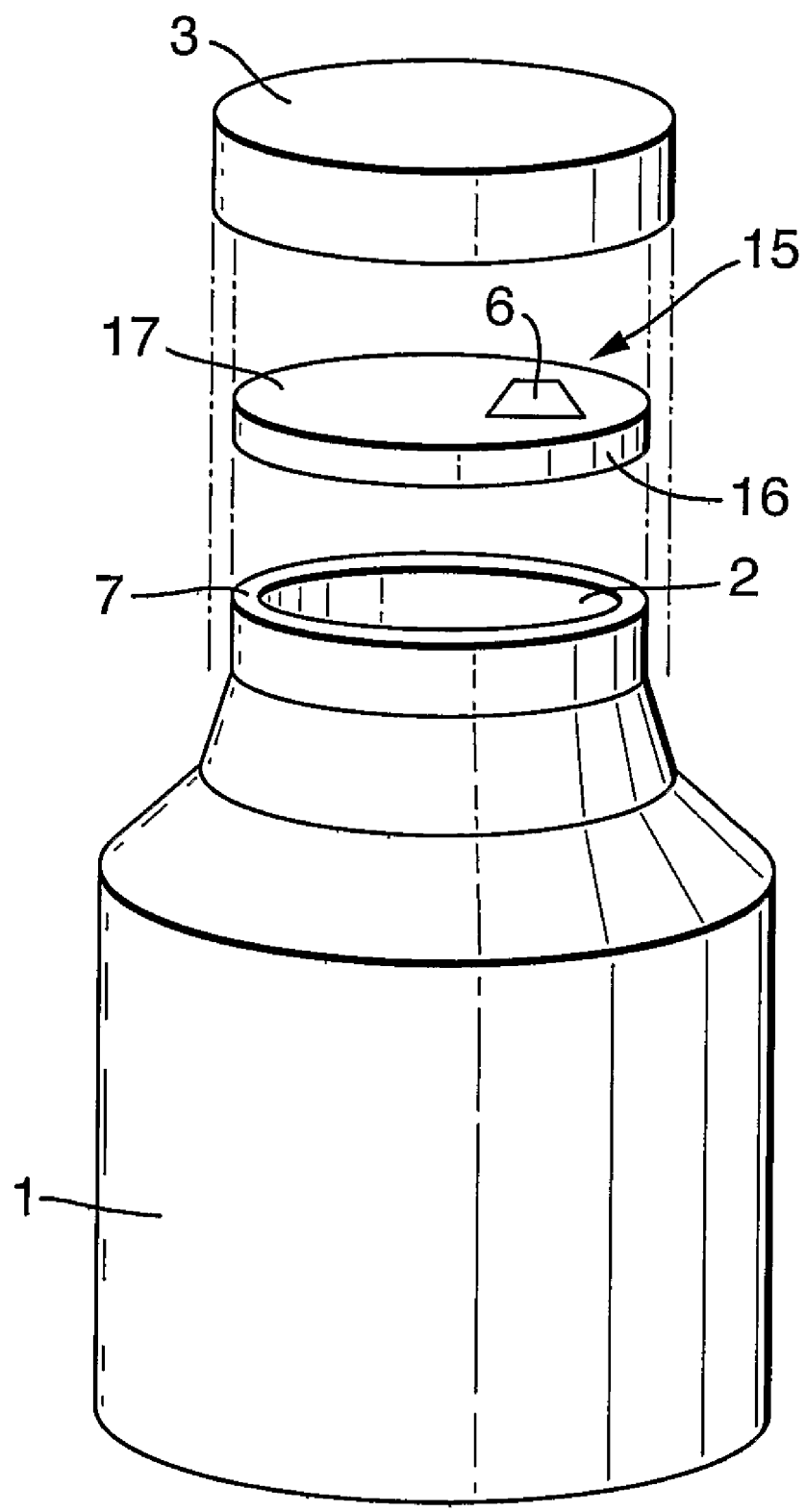
FIG. 6 illustrates an exploded view of a container incorporating a seal arrangement in a second embodiment.

FIG. 6 illustrates an alternative embodiment whereby the seal arrangement 4 of the above embodiment (i.e. that having a flattened ring-like construction) is replaced with an alternative type of seal arrangement in the form of a disc. The features illustrated in FIG. 6 which correspond to features already described in the above embodiment are denoted by like reference numerals and will not be discussed further.

Seal arrangement 15 is formed in a disc-shape and does not have a hole at its centre. The seal arrangement 15 comprises a disc seal 16, a detector membrane 17, a transceiver antenna (not shown) and a monitoring unit 6. The detector membrane 17 is suitable for detecting tampering with the container within which the seal arrangement 15 is located (e.g. by removal of the lid 3 of the container 1 and replacement of the lid 3, or by introducing a foreign substance into said container 1 by way of a hypodermic needle which pierces the lid 3 of the container 1). The monitoring unit 6 located in said seal arrangement 15 is connected to both the detector membrane 17 and the antenna (not shown).

Figure 7:
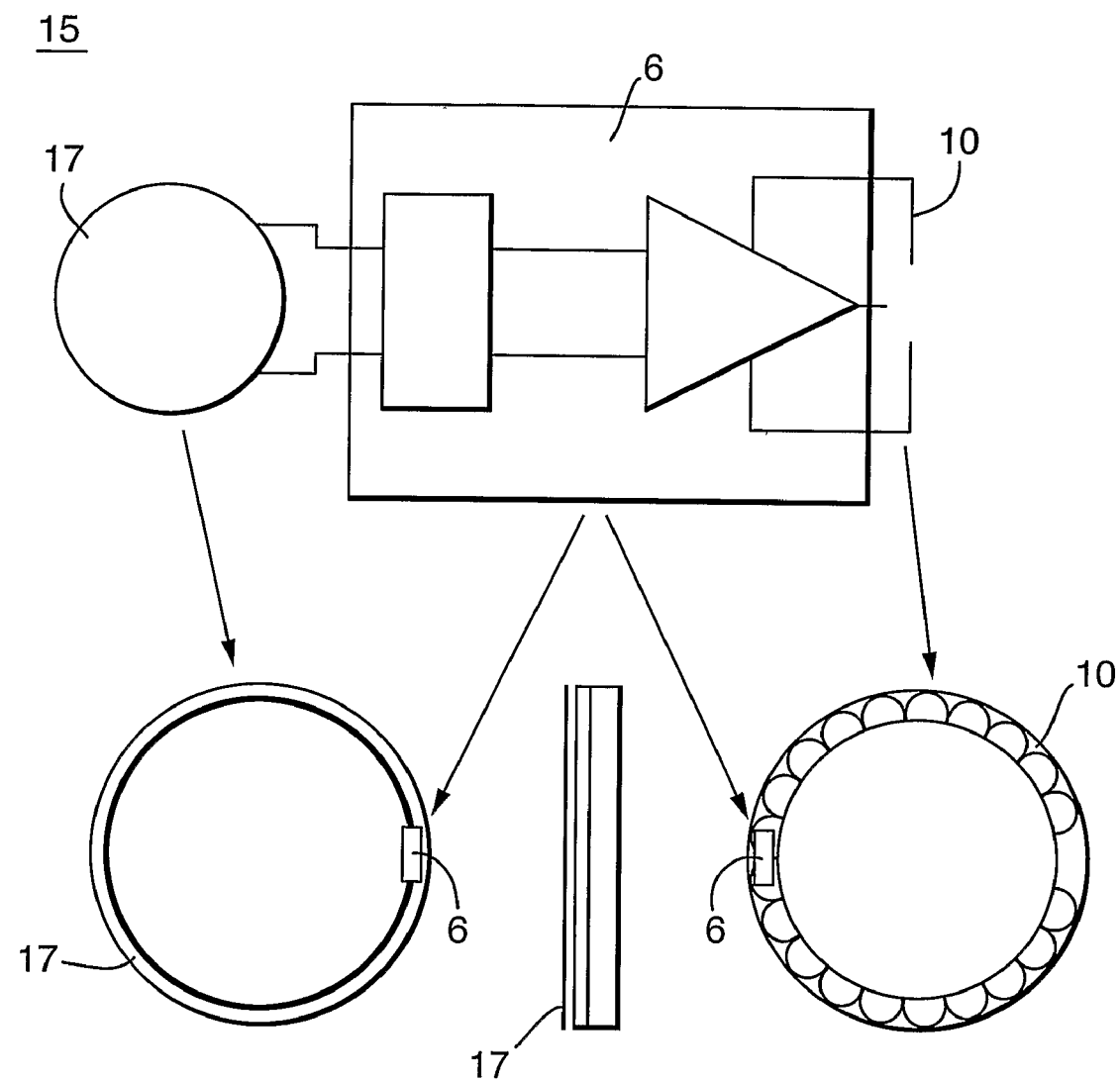
FIG. 7 illustrates a partial schematic diagram of the seal arrangement of FIG. 6 alongside plan, reverse plan, and cross-sectional views of said seal arrangement.

Turning now to FIG. 7, which is similar to FIG. 5, with the only difference being the replacement of seal arrangement 4 with the seal arrangement 15. In this embodiment the detection element is the detector membrane 17 which is arranged, when in position on said container 1, to align with the opening in said container 1. Any attempt to open the lid 3 of the container 1 will result in breakage of the detector membrane 17 in the same fashion as described above in relation to detector 9. Further, the detector membrane 17 is able to detect for a hypodermic needle (or any other type of sharp article) piercing the lid 3 of the container 1. Any attempt to pierce the lid 3 of the container 1 will also pierce the detector membranes, thereby alerting the monitoring unit 6 that the integrity of the seal has been compromised.

Figure 8:
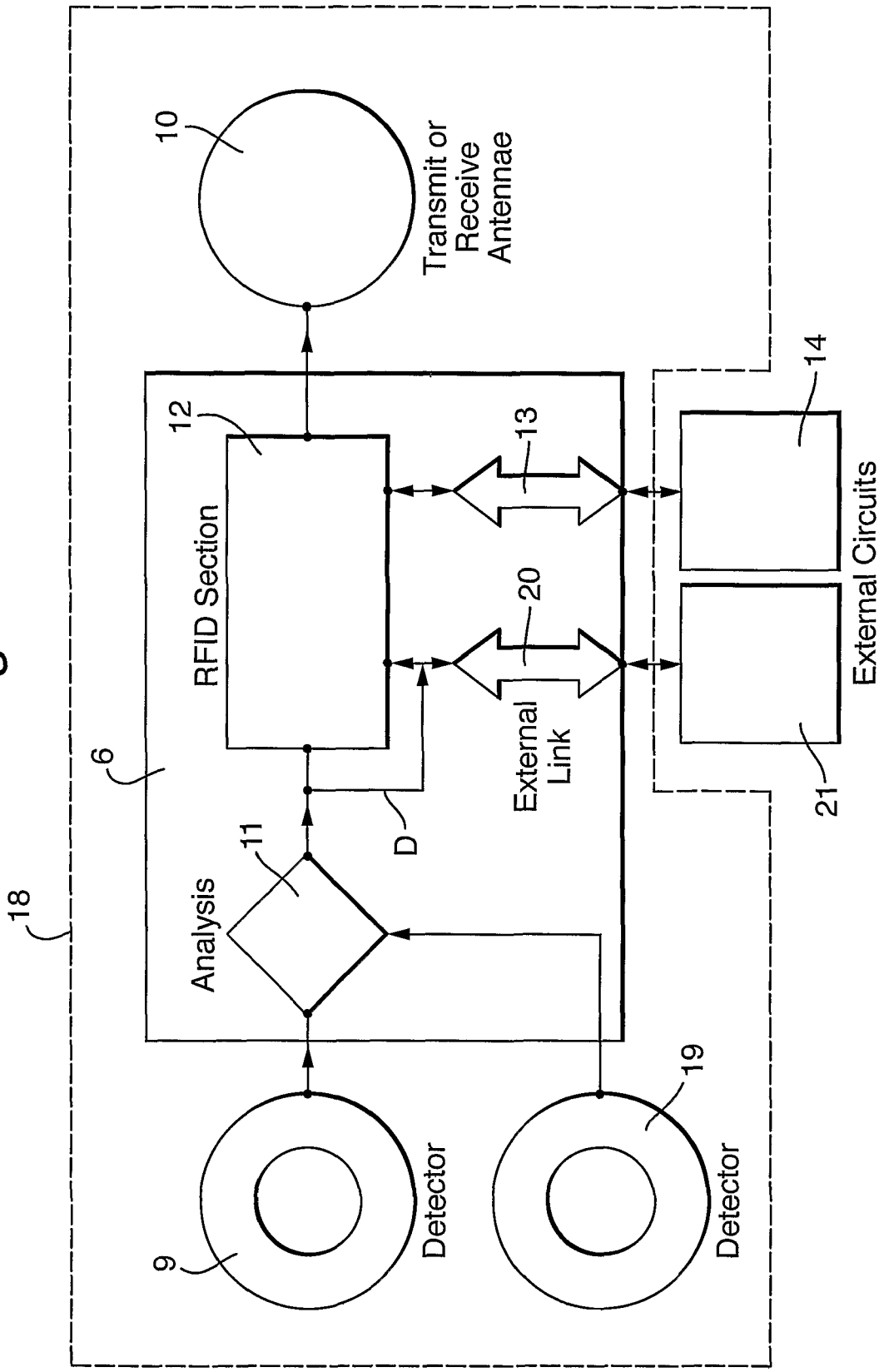
FIG. 8 illustrates a schematic diagram of a seal arrangement in a third embodiment.

FIG. 8 illustrates another embodiment of the present invention which comprises a further arrangement of the seal arrangement.

The Figure is a schematic diagram of seal arrangement 18. The features illustrated in FIG. 8 which correspond to features already described in the above embodiments are denoted by like reference numerals and will not be discussed further. The arrangement of features in the embodiment shown in FIG. 8 is similar to the embodiment shown in FIG. 4. However, the embodiment illustrated in FIG. 8 differs from that of FIG. 4 in that an additional detector 19 is provided on said seal arrangement 18, and an additional external link device 20 is provided within the the monitoring unit 6 to allow coupling of a second external circuit 21 to said RFID section 12.

The additional detector 19 is coupled to analysis section 11 and is arranged to detect for a different change of state within the container than the other detector 9. Whereas detector 9 detects for tampering with the lid of the container, and uses an electrical circuit which, if broken, alerts the analysis section 11 that the lid of the container has been tampered with in some way, detector 19 comprises, in this embodiment, a piezoelectric element which is arranged to detect a change in the pressure applied to detector 19 (as would be expected when the lid is removed from the container), and the detector 19 is arranged to notify the analysis section 11 (upon "interrogation") if such a change in pressure is detected.

Also shown in FIG. 8, is a direct link D from the analysis section 11 to additional external link device 20. Although external link device 20 forms a link between RFID section 12 and second external circuit 21, data can also be passed to the second external circuit 21 from the analysis section 11 via direct link D and external link device 20.

Either of the detectors in this embodiment (i.e. detector 9 or detector 19) could be replaced by any other type of detector (or combination of detectors) which can detect a change of state within the container. For example, one of the detectors could be replaced by the detector membrane 17 of the second embodiment, or by detectors for sensing:
 (a) the presence of gases in the container;
 (b) changes of temperature in the container;
 (c) if the container and its contents have been subject to radiation;
 (d) physical/chemical/biological changes within the container brought about by physical/chemical/biological changes in the stored product;
 (e) changes in electrical state of the detector, such as Voltage, Resistance, Current, Capacitance, Inductance, or Electromagnetic interference (EMI);
 (f) changes in magnetic state of the detector, such as the magnetic field;
 (g) changes in geometric state such as deflection (e.g. by deformation), stretching, shrinking, expansion or contraction;
 (h) changes in location/physical position of the detector within the container compared to a "known" location/physical position; or
 (i) changes in location/physical position of the container as a whole compared to a "known" location/physical position.

In any of the above embodiments, two or more external link devices may be provided in the monitoring unit 6 to allow communication between the analysis section and two or more external circuits, and/or the RFID section and two or more external circuits.

Figure 9:
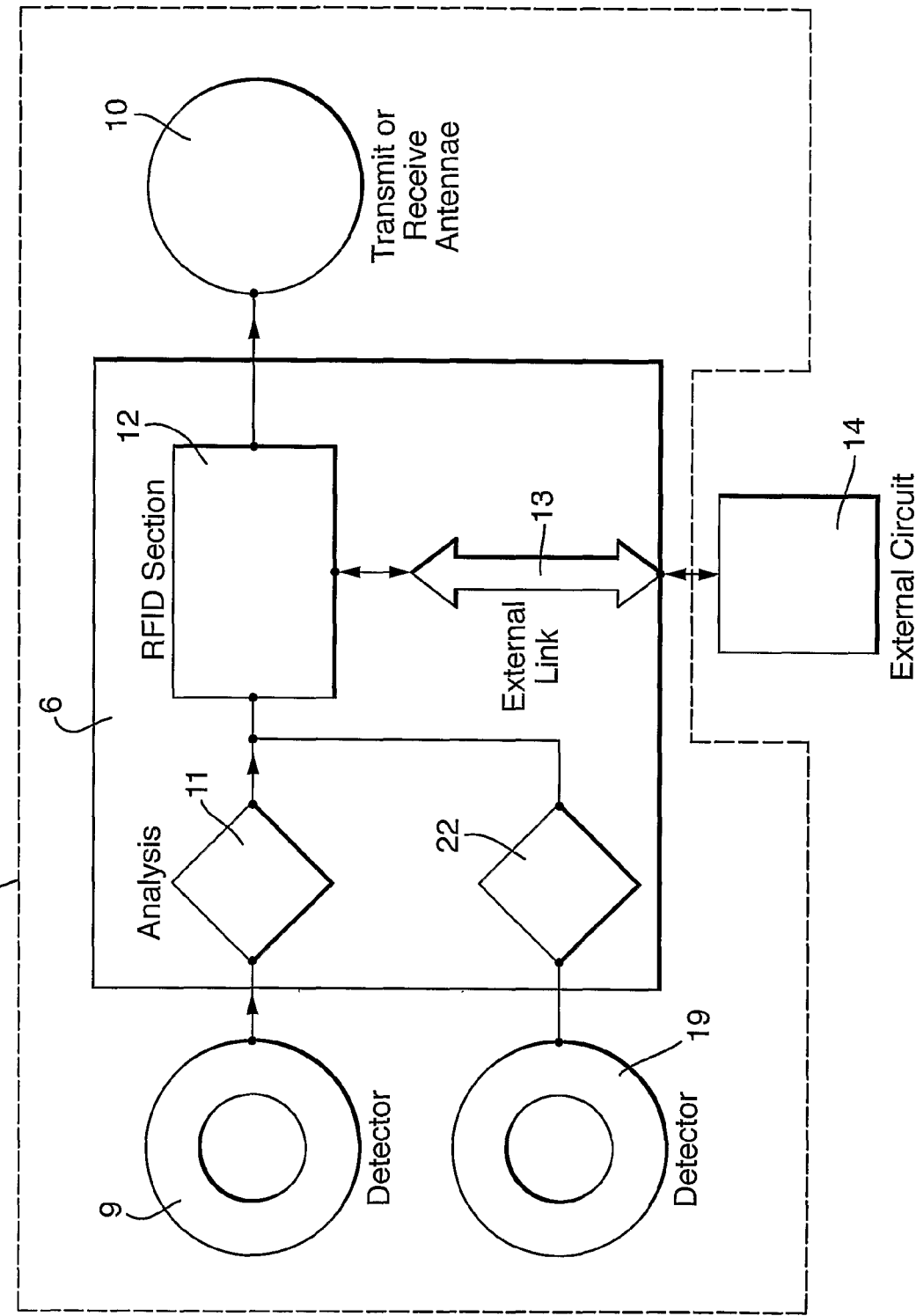
FIG. 9 illustrates a schematic diagram of a seal arrangement in a fourth embodiment.

FIG. 9 illustrates an alternative arrangement of the embodiment of FIG. 4. As in the embodiment described in relation to FIG. 8, the seal arrangement comprises a second detector, but in this arrangement the monitoring unit 6 now also comprises a second analysis section 22.

The Figure shows seal arrangement 23 comprising first detector 9 coupled to analysis section 11 located in monitoring unit 6, and second detector 19 coupled to second analysis section 22 also located in monitoring unit 6. Both of said analysis sections (11, 22) are coupled to a single RFID section 12. The remaining features are the same as the embodiment described in relation to FIG. 4 and so no further description of these features is required.

Again, any combination of detector types can be used with this arrangement and also, two or more external link devices may be provided in said monitoring unit 6 to allow communication between either the analysis sections and two or more external circuits, and/or the RFID section and two or more external circuits.

FIGS. 10A to 10D illustrate further alternative arrangements for the seal arrangement of the present invention.

Figure 10A:
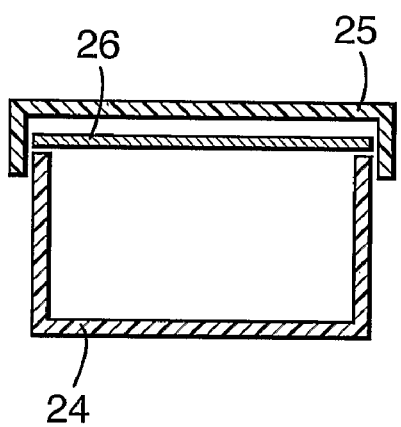
FIG. 10A illustrates a cross-sectional side view of a container incorporating a seal arrangement in a fifth embodiment.
Figure 10B:
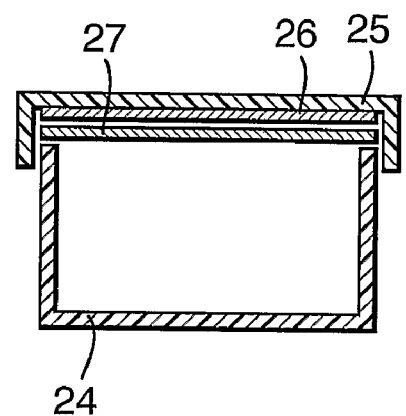
FIG. 10B illustrates a cross-sectional side view of a container incorporating a seal arrangement in a sixth embodiment.

FIG. 10A illustrates a container 24 and a corresponding lid 25 in engagement with each other. A seal arrangement 26 is located such that it is aligned with the opening of the container and is held in position by way of the pressure exerted by the lid against the sides of the container formed by the peripheral edge of the opening.

In FIG. 10 B, a seal arrangement 26 is located adjacent lid 25. A gasket 27 is positioned between the seal arrangement 26 and the sides of the container formed by the peripheral edge of the opening.

Figure 10C:
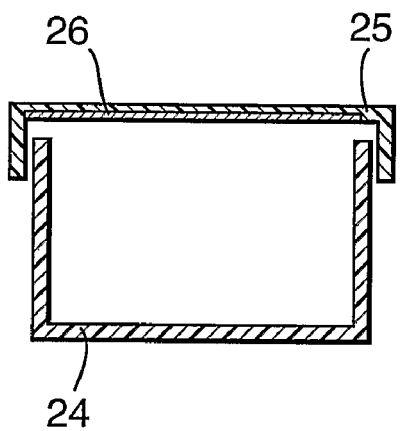
FIG. 10C illustrates a cross-sectional side view of a container incorporating a seal arrangement in a seventh embodiment.

In FIG. 10C, the seal arrangement 26 is embedded in the lid 25.

Figure 10D:
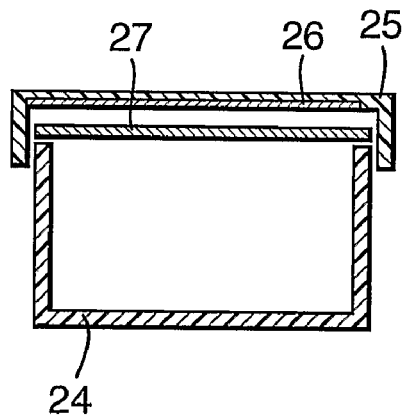
FIG. 10D illustrates a cross-sectional side view of a container incorporating a seal arrangement in an eighth embodiment.

FIG. 10D illustrates an arrangement which uses the "embedded" seal arrangement 26 of FIG. 10C and a gasket 27 positioned between the seal arrangement 26 and the container 24.

Figure 11A:
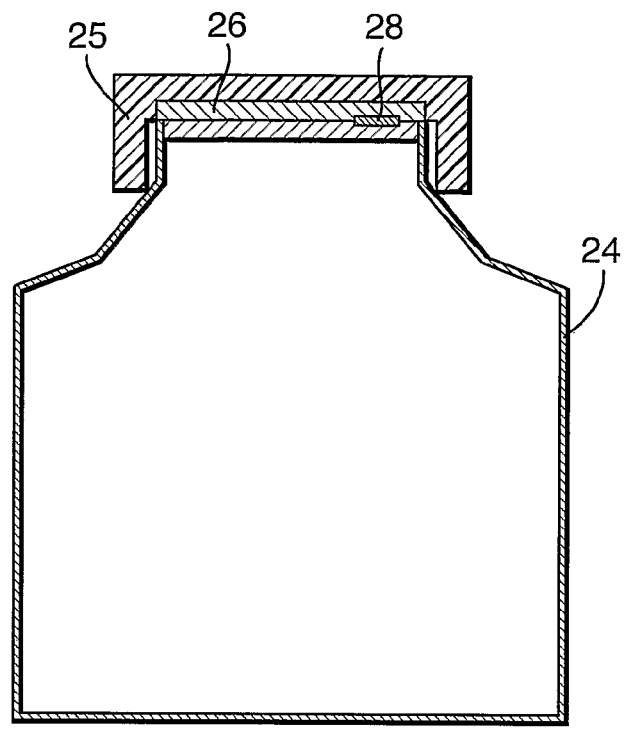
FIGS. 11A and 11B show cross-sectional side views of a container incorporating a seal arrangement in a ninth embodiment.
Figure 11B:
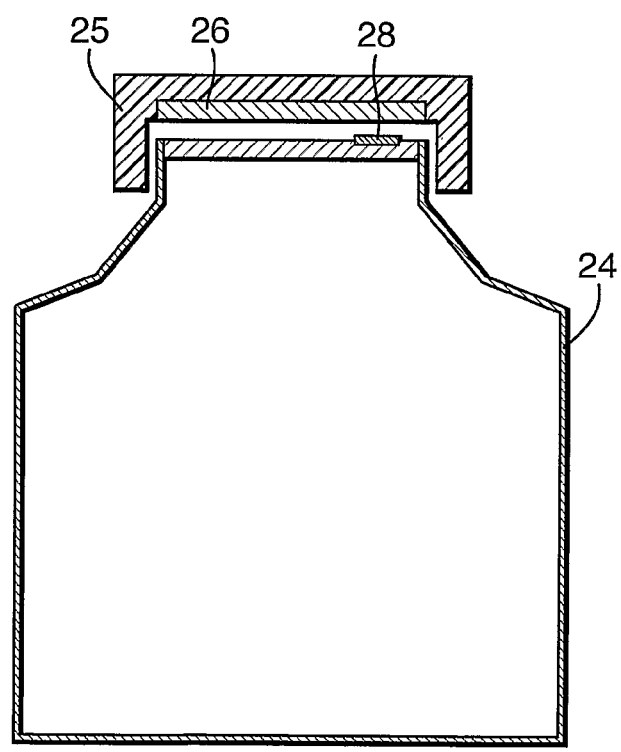

FIGS. 11A and 11B illustrate an embodiment of the present invention where the "embedded" seal arrangement of FIG. 10C is used. Features which have been described previously are referred to by like reference numerals and no further description of these features is necessary.

In FIG. 11A, a lid 25 containing embedded seal arrangement 26 engages with container 24. A connecting substance 28 is attached to both the embedded seal arrangement 26 and to the peripheral edge of the opening of the container 24. The connecting substance 28 does not extend around the entire peripheral edge of the opening, but rather its length is such that it only covers part of the peripheral edge of the opening of the container 24.

FIG. 11B illustrates the case where the lid 25 of the container 24 has been unscrewed and the seal formed by the connecting substance 28 between the embedded seal arrangement 26 and the peripheral edge of the opening of the container 24 is broken. The connecting substance 28 remains attached to the peripheral edge of the opening of the container, but has become detached from the embedded seal arrangement 26. Therefore, when the analysis section (not shown) of the monitoring unit (not shown) "interrogates" the detector, the detector will attempt to send a signal through an electric circuit formed between the detector and the connecting substance, but will not receive a reply to this signal since the electric circuit has been broken. The detector then informs the analysis section that the seal between the lid and the container has been broken.

FIG. 12 illustrates a further embodiment employing a seal arrangement as previously described. In this embodiment, a pipeline 29 is made up from pipe sections 30 which are joined at the open ends thereof to adjacent pipe sections 30 by means of seal arrangements 31. These seal arrangements 31 are of the "ring" type discussed above.

The integrity of the seals between adjacent pipe sections can be monitored by a user 32 provided with a reader 33. The user 32 passes the reader 33 along the length of the pipeline, and the reader sends a signal to each seal arrangement 31 in turn. Each seal arrangement 31, upon "interrogation" by said reader 33, performs analysis to determine if the integrity of the seal has been compromised. Once said analysis has been performed, the seal transmits a signal to the reader 33 containing data resulting from the analysis.

FIG. 13 illustrates an alternative arrangement of the "pipeline" embodiment of FIG. 12 where each seal arrangement 31 is coupled to the next so that data/information may be passed from one seal to another. The connection between seal arrangements 31 is denoted by C. Therefore, in this arrangement it is only necessary for the reader 33 to "interrogate" one seal arrangement (shown as seal arrangement X in FIG. 13) in order to obtain information on the integrity of any one of the seals in the pipeline.

The seal arrangements may be coupled by electronic means (as illustrated in FIG. 13) or optical means.

The embodiment described above is intended to be used in an "passive" mode, but alternatively, the seal arrangements are provided with a source of power and operate in an "active" mode, i.e. they constantly transmit data relating to the integrity of the seal.

FIG. 14 illustrates a further arrangement of the pipeline embodiment where some of the seal arrangements 31 are coupled together by optical/electrical means (as in FIG. 13) in sections, and those sections are coupled by a radio-link 34.

Figure 15:
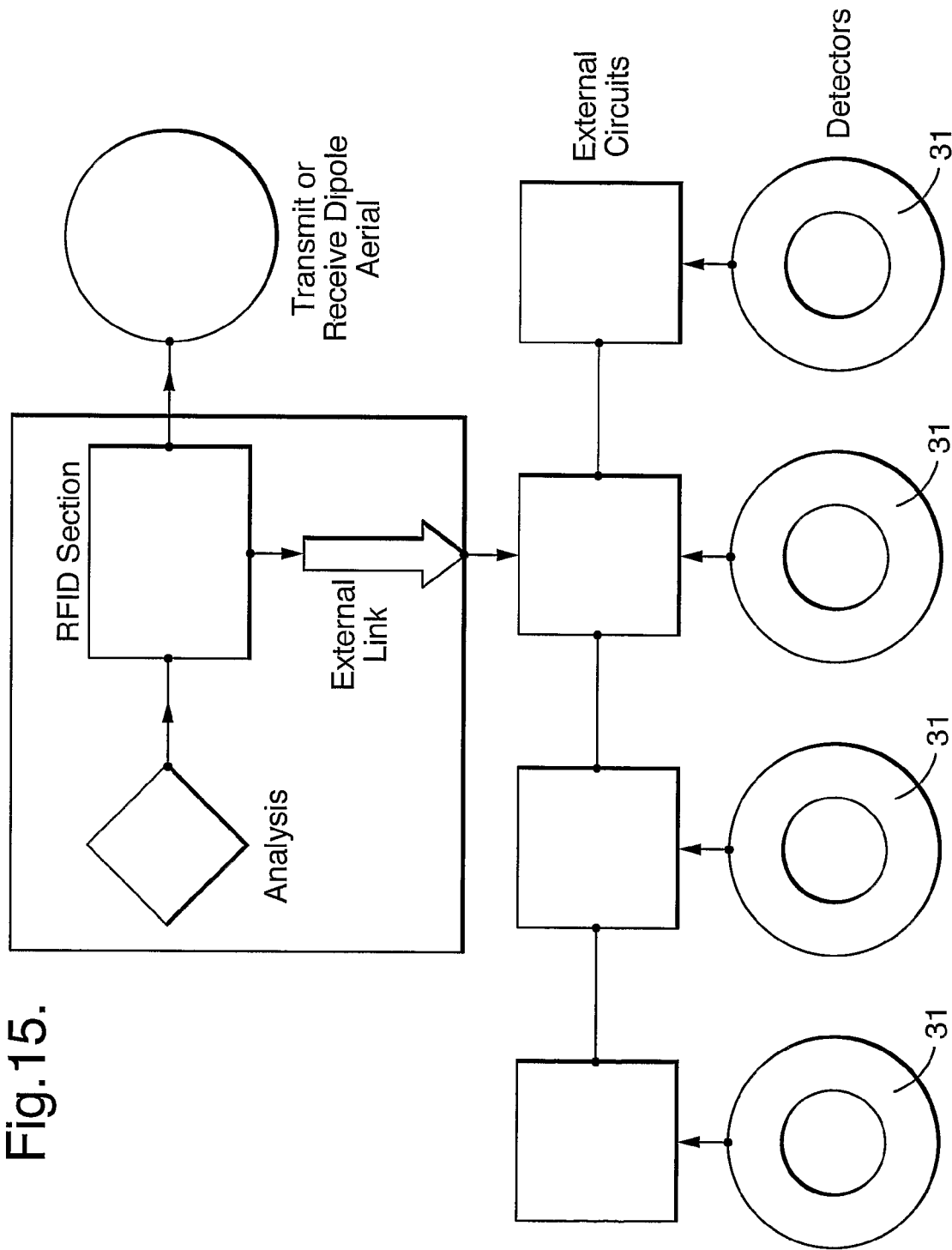
FIG. 15 illustrates a schematic diagram of a seal arrangement. suitable for use as the seal arrangement in the embodiments of FIGS. 13 and 14.

FIG. 15 is a schematic illustration of the embodiments of FIGS. 13 and 14. All previously described features retain the same reference numerals as were used previously. In this embodiment, the external circuits represent an electronic link between neighbouring seals in the pipeline (as shown in FIG. 13). Alternatively, the external circuits could be optical links between the seals or radio-links (as shown in FIG. 14).

FIGS. 16a to 16e illustrate different detector configurations for the detectors on seal arrangements.

Figure 16A:
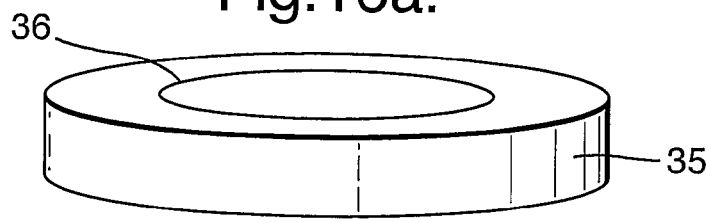
FIGS. 16A to 16E show different detector arrangements on seal arrangements.

FIG. 16a illustrates a seal 35 in the form of a disc, provided with a detector 36 on a flat surface thereof. The detector 36 is a single track of conductive material in the form of a loop.

Figure 16B:
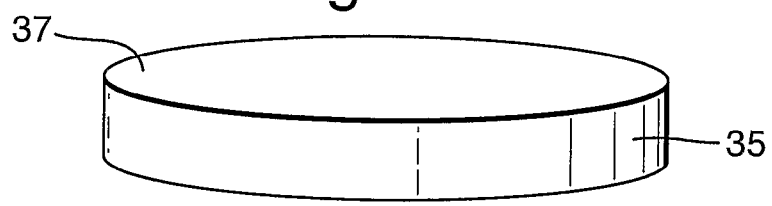

In the arrangement of FIG. 16b, the seal 35 is provided with a detector 37 in the form of a circular sheet arranged on a flat surface of said seal 35. The diameter of the detector 37 is the same as the diameter of the disc which forms the seal 35, and the detector 37 is located on said seal 35 such that the centre of the detector 37 is coaxial with said disc.

Alternatively, the diameter of detector 37 is not the same as the diameter of the disc which forms the seal 35.

In a further alternative arrangement, the detector 37 is located on said seal such that the centre of the detector 37 is not coaxial with said disc.

Figure 16C:
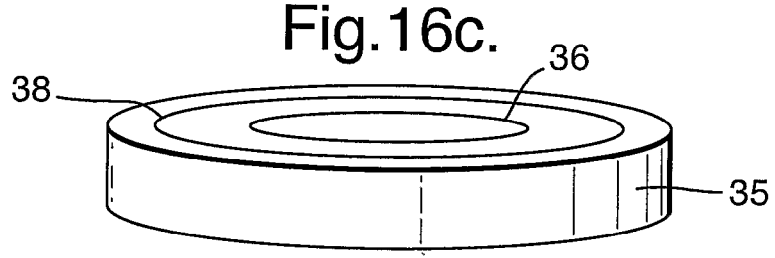

The arrangement of FIG. 16c is similar to that described in relation to FIG. 16a, except that the seal 35 is provided with an additional detector 38 on the flat surface of the seal 35. Detector 38 is a single track of conductive material in the form of a loop, but the circumference of the loop formed by detector 38 is larger than the circumference of the loop formed by detector 36. In this arrangement, the loops of detectors 36 and 38 are concentric.

Figure 16D:

FIG. 16d illustrates a seal 35 in the form of a disc, provided with a detector 39 on the curved face of the disc. In this arrangement the detector 39 covers the entire surface of the curved face of the disc. However, in a further alternative the detector may be a strip which forms a circuit about said disc, but which does not extend across the height of the surface of the disc.

Figure 16E:
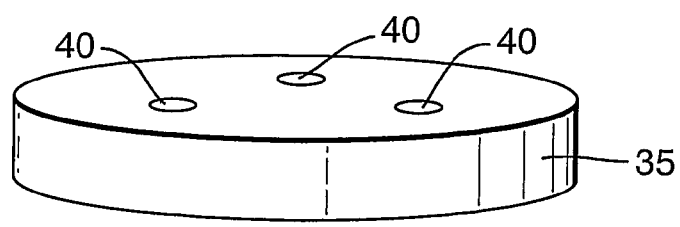

In FIG. 16e, there is shown a seal 35 in the form of a disc, provided with detectors 40 on the flat surface of the disc. The detectors are formed as discrete units or "islands" on the flat surface and are arranged to detect for different changes in the state of the seal (e.g. temperature, pressure, etc.). Alternatively, the detectors may be arranged to detect for the same changes in state of the seal.

Figure 17:
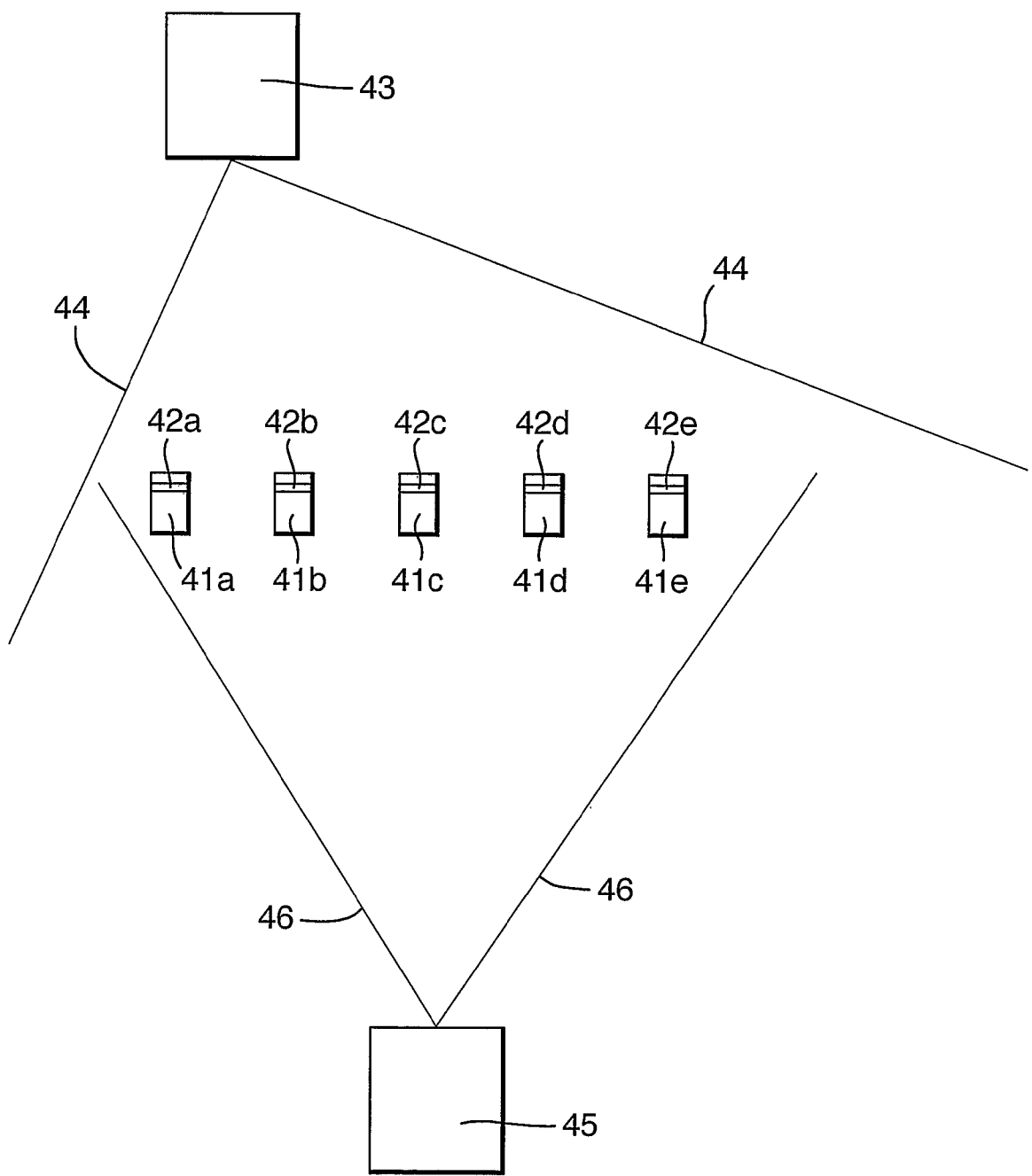
FIG. 17 illustrates a schematic diagram of containers incorporating seal arrangements in a thirteenth embodiment.

FIG. 17 illustrates a further embodiment of the present invention, where the seal arrangement is arranged to operate in a "semi-active" mode (i.e. the seal arrangement is not provided with its own power source, but is powered by a fixed reader in proximity to the seal arrangement).

As can be seen, a plurality of containers 41a-41e are provided, each of which has a seal arrangement 42a-42e. The containers 41a-41e are located in proximity to a fixed-reader 43 which serves as a power source to power the seal arrangements 42a-42e of containers 41a-41e. The signal emitted by said fixed reader 43 is denoted by divergent lines 44 emanating from fixed reader 43. As can be seen, each of the containers 41a-41e (and the corresponding seal arrangements 42a-42e) lies within the transmission coverage area of the fixed reader 43. Such an arrangement causes the seal arrangements 42a-42e to be continually powered and therefore allows the seal arrangements 42a-42e to transmit a continuous signal indicative of the integrity of each seal.

A handheld reader 45 is able to receive signals emanating from points in a coverage area denoted by divergent lines 46, i.e. any signal transmitted from a point lying within the area between divergent lines 46 will be received by handheld reader 45. Therefore, when an operator passes said handheld reader 46 past containers 41a-41e, it will receive five separate signals emitted by seal arrangements 42a-42e respectively, with each signal carrying information relating to the integrity of the particular seal arrangement which emitted the signal. The handheld reader 45 does not need to "interrogate" the seal arrangements 42a-42e in this embodiment because each one of the seals continuously transmits a signal.

In an alternative arrangement of the embodiment described in relation to FIG. 17, the handheld reader 45 scans all five seal arrangements 42a-42e in one operation, and receives signals from said seal arrangements 42a-42e at the same time. However, in this arrangement, each one of the seal arrangements 42a-42e is linked to every other seal arrangement such that, if the integrity of one of the seals has been compromised, each one of the seal arrangements in which the seal has not been compromised transmits a signal to the handheld reader 45 indicating the integrity not only of its own seal, but also of the other seals. A suitable "triangulation" operation then allows the handheld reader to identify which of the five containers has a faulty seal.

The arrangement of FIG. 17 may also be used in a pipeline (e.g. in one of the examples of FIG. 12, 13 or 14) whereby a fixed reader provides power to one or more of the seals between the pipe sections of the pipeline.

In an alternative arrangement to that of FIG. 17, a plurality of fixed readers are provided to provide power to one or more seal arrangements.

In the above embodiments relating to the use of seal arrangements in containers, the monitoring unit of the seal arrangement may also be provided with an identification unit which stores data relating to the specific container in which it is located and also the product stored within the container. Such information may be, for example, the date of production of the product, an expiry date of the product in the container, an identification no. which differs for each container and serves to identify the container, etc.

Such information may then be made available when an operator performs a check on the integrity of the seals of the containers. The information made available allows the operator to perform an inventory (or "stock-take") of the containers at the same time as checking the integrity of the seals, thereby reducing the amount of operator effort required during "stock-taking". This feature also has the advantage of eliminating operator error in, for example, identifying products which have passed their expiry date since all information is stored in the monitoring unit of the seal arrangement.

In the above embodiments, the external circuits may be any one, or a combination, of electrical conducting elements, optical transmission elements, radio transmission elements, PCs, personal digital assistants (PDAs), or the like.

Figure 18:
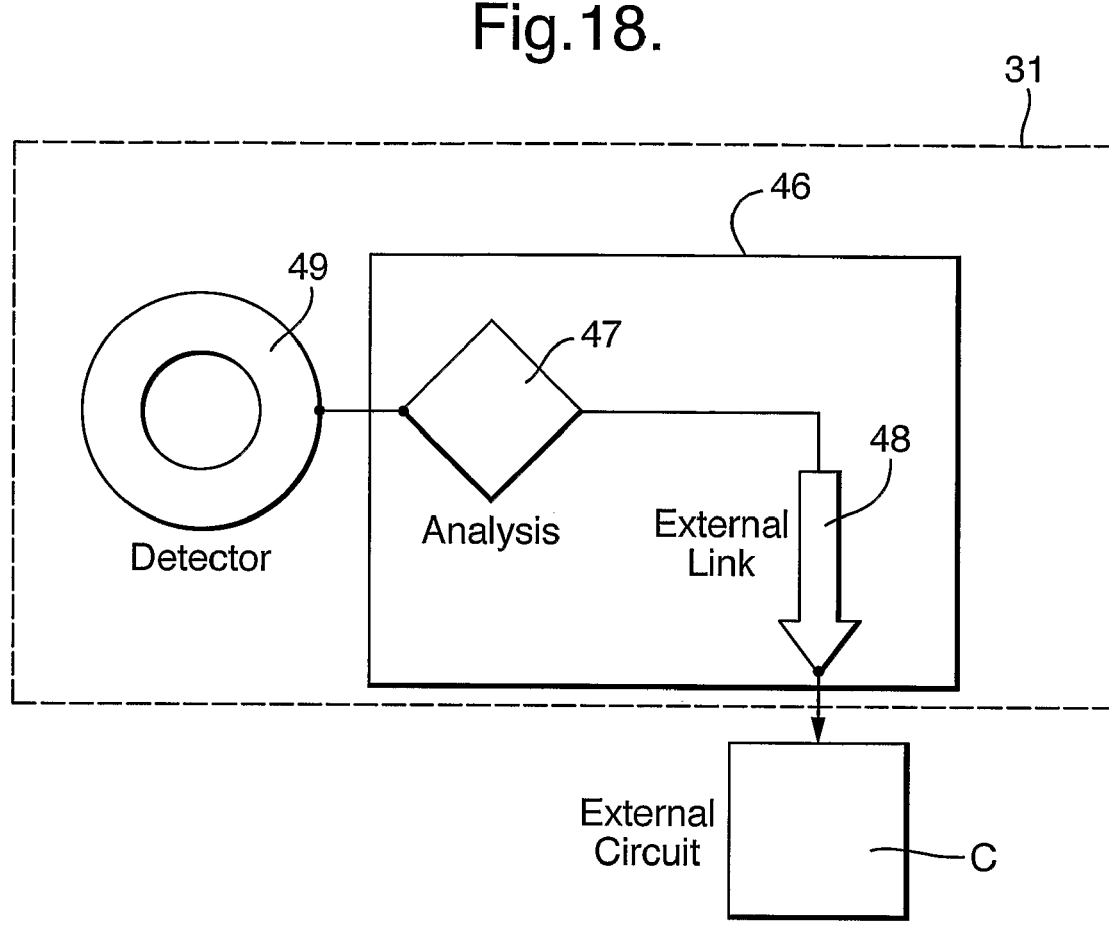
FIG. 18 illustrates a schematic diagram of a seal arrangement suitable for use as the seal arrangement in the embodiment of FIG. 13.

FIG. 18 illustrates a further type of seal arrangement. In this embodiment, seal arrangement 31 comprises a monitoring unit 46 which comprises an analysis section 47 which is coupled to an external link device 48. The seal arrangement also comprises a detector 49 which is coupled to the analysis section 47 of the monitoring unit 46. The external link device 48 is coupled to an external circuit C.

It should be noted that, unlike the seal arrangements described in earlier embodiments, the seal arrangement of FIG. 18 does not possess an RFID section. The seal arrangement is effectively "dumb" since it has no means to transmit a signal via an antenna. However, such an arrangement is suitable for use in, for example, the embodiment illustrated in FIG. 13. The external circuit C in FIG. 18 corresponds to the electrical connection C of FIG. 13 and the seal arrangement 31 corresponds to any one of the seal arrangements of FIG. 13 except for seal arrangement X. Seal arrangement X is provided with an RFID means and so can communicate with a reader device (as shown in FIG. 13) and can pass on signals from the reader 33 to any other seal arrangement 31 and receive signals from any of seal arrangements 31 by way of electrical connection C. Therefore in this arrangement, which combines the embodiment of FIG. 18 with that of FIG. 13, it is only necessary for the user 32 to operate the reader 33 to interrogate one seal arrangement (i.e. seal arrangement X) in order to determine the integrity of any seal arrangement which is connected to the seal arrangement X.

Figure 19:
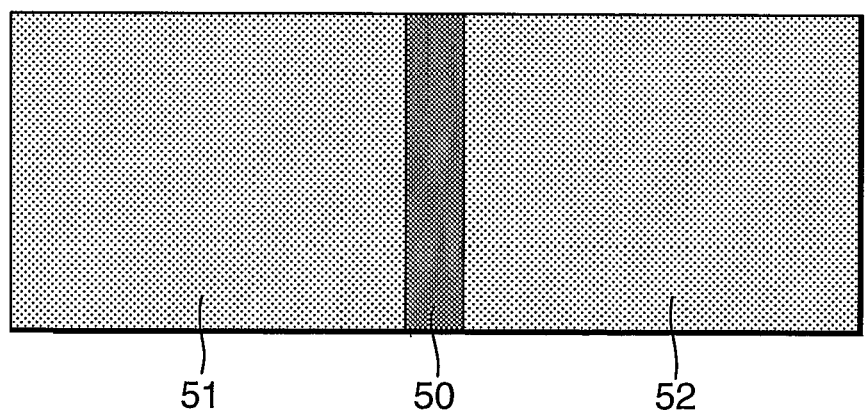
FIG. 19 illustrates a schematic diagram of a general arrangement of the seal arrangement of the present invention, with said seal arrangement located between two objects.

FIG. 19 illustrates a seal arrangement 50 located between two objects 51, 52 and arranged to provide a seal therebetween. Said seal arrangement 50 may comprise any one (or a combination) of the aforementioned seal arrangements, and may also comprise other arrangements described hereinafter.

The objects 51, 52 may comprise any two containers (which may be identical, similar or different) which may or may not be in fluid communication, via the seal arrangement 50, with each other. Alternatively, the objects 51, 52 may be a pipe/tube and, for example, a reservoir, with the seal arrangement 50 arranged to measure, for example, flow rate of a fluid to and/or from said reservoir.

Said objects 51, 52 may, in fact, be any two identical, similar or different objects which may or may not be sealed at their ends remote from said seal arrangement 50, and which may or may not be in fluid communication with each other.

Of course, the seal arrangement of the present invention is not limited to a seal between two objects but may be located in (or form) a junction between any number of objects where a seal is required where the objects meet at said junction.

The seal arrangement 50 may be connected to said objects 51, 52 via known connection means (e.g. screw-thread, male/female configurations, compression joints, etc.).

In another particular arrangement said seal arrangement may be a "stopper" in, for example, a bottle. The seal arrangement may be located within (or may form), for example, a wine or champagne cork and may be arranged to monitor the state of the seal formed between the seal arrangement and the bottle. In such an arrangement, the "active" surface (i.e. the detection surface) of the seal arrangement may be located on the inner end portion of the cork (i.e. the end closest to the liquid in the bottle), may be located on the side portions of the cork (i.e. those portions in contact with the inside of the bottle), may be within a hollow interior of said cork, or may be a combination of these, or any of the other "active" surface arrangements described hereinafter.

The transceiver antenna in the above embodiments is, preferably, a dipole aerial, but may alternatively be any type of suitable transceiver antenna.

In the above described embodiments, the components (i.e. the detector(s), analysis section(s), RFID section, external link device(s) and antenna(e)) of the seal arrangement are provided in one package, but in alternative arrangements, the components are provided as either completely separate packages which are interconnected by suitable means, or as packages containing two or more (but not all) of the components of the seal arrangement which are interconnected by suitable means.

The above mentioned packages may be any one, or a combination of, silicon or physical circuits, e.g. printed circuit boards (PCBs), laminates, etc.

A particular example of components of the seal arrangement being located on more than one package is a "remote seal" arrangement whereby a detector is provided in the seal itself, and analysis, RFID and antenna sections are provided remote from said seal on one or more packages. In this arrangement, the detector may communicate with the other package(s) by means of electronic/optical transmission methods, a combination thereof, or any other suitable method. Such an arrangement is particularly advantageous in harsh environments where the analysis, RFID and antenna sections cannot be located in such environments, e.g. in the monitoring of fluids in a vehicle—the package(s) containing the analysis, RFID and antenna sections can be located in a "dry" environment remote from the region where monitoring takes place (i.e. the location of the seal containing the detector) and thereby avoid damage through exposure to fluids.

The detectors used as the detectors in the seal arrangements of the above embodiments could be any one or more of detectors which detect:
  (a) the presence of gases in the container;
  (b) changes of temperature in the container;
  (c) if the container and its contents have been subject to radiation;

(d) physical/chemical/biological changes within the container brought about by physical/chemical/biological changes in the stored product;
(e) changes in electrical state of the detector, such as Voltage, Resistance, Current, Capacitance, Inductance, or Electromagnetic interference (EMI);
(f) changes in magnetic state of the detector, such as magnetic field;
(g) changes in geometric state such as deflection (e.g. by deformation), stretching, shrinking, expansion or contraction;
(h) changes in location/physical position of the detector within the container compared to a "known" location/physical position; or
(i) changes in location/physical position of the container as a whole compared to a "known" location/physical position.

The number of detectors used in the seal arrangement need not be limited to only two detectors, but could be a combination of any number of the above detector types.

The detectors also need not be limited to conductive rings or membranes which use one of the above mentioned detection methods (which includes detection, by conductive rings or connections, of tampering when a substance in the container "shorts" the conductive elements of the container), but could also include meshes, concentric rings or connections which use one of the above mentioned detection methods and can also detect tampering by "shorting" of the conductive elements of the detector caused either by piercing of the detector by an external source or by a substance within the container.

The detectors may also use combinations of the above configurations of detectors. Also, the detectors may have the "active" surfaces located (in addition/as alternatives to the arrangements described in relation to FIGS. 16a to 16e) on upper/lower surfaces of the seal arrangement (for disc-type detectors, annular-type detectors or detectors having an aperture), inner/outer surfaces of the seal arrangement (for annular-type detectors or detectors having an aperture), or any combination of these arrangements.

A seal arrangement where the seal portion is formed as a sheet-like member, and said sheet-like member is formed with an aperture, is particularly suited as a head-sealing gasket for a vehicle engine block. Of course, different numbers of apertures may be provided in said sheet-like member in correspondence with the number of cylinders in the vehicle engine block.

The seal arrangement may comprise a continuous ribbon which is suitable for encircling letters, parcels or packages and for providing evidence of any tampering with such items.

Where the above detectors operate in an "active" mode, the power may be obtained from, for example, a battery. Any other suitable power source could, of course, be used to power the detectors when operating in the "active" mode.

In the above embodiments, seal arrangements provided with only one RFID section are described. However, in alternative arrangements, a plurality of RFID sections may be provided to carry out different functions. These RFID sections would operate at different frequencies to avoid interference, and thereby allow a number of different activities to take place at the same time. The plurality of RFID sections are provided with separate individual antennae (or a combination of antennae).

In a further alternative arrangement, the detector element of the seal arrangement forms the entire sealing portion of the seal arrangement (i.e. the seal arrangement is formed entirely from the detector material). The other components of the seal arrangement are encased within the detector material which forms the seal.

The seal arrangement may be bonded to the lid of the container using an adhesive, or it may be held in place between lid and container, when sealed, by means of the pressure exerted by the lid on the container and vice-versa. The seal arrangement may also be embedded within the lid of the container. Further, the seal arrangement may be used in conjunction with a sealing gasket.

In a further alternative arrangement, the seal arrangement is formed in the material of the closure member, or lid (i.e. the seal arrangement is actually the closure member).

The invention claimed is:

1. A seal arrangement for location between two components, the arrangement comprising a seal portion having embedded therein monitoring means comprising detection means having a sensor arranged to detect a change in the geometric state of the seal portion and to thereby determine the integrity of said seal portion, and further comprising radio frequency identification (RFID) means arranged to receive signals from the monitoring means and to produce an output signal in response to the determination of the integrity of the seal portion.

2. A seal arrangement according to claim 1, wherein said monitoring means further comprises the said at least one radio frequency identification (RFID) means for producing an output signal in response to the integrity of the seal portion as determined by the said detection means.

3. A seal arrangement according to claim 2, wherein said at least one RFID means is arranged to transmit a signal indicative of the integrity of said seal in response to interrogation from a reader device.

4. A seal arrangement according to claim 2, wherein said at least one RFID means is arranged to transmit a signal indicative of the integrity of said article continuously without external interrogation.

5. A seal arrangement according to claim 2, wherein said at least one RFID means is arranged to transmit a signal containing data identifying the seal arrangement.

6. A seal arrangement according to claim 2, wherein said monitoring means further comprises at least one external link means coupled to said at least one RFID means.

7. A seal arrangement according to claim 6, wherein at least one of said at least one external link means are further coupled to said at least one determining means.

8. A seal arrangement according to claim 6, wherein said at least one external link means are each operable for coupling to an external device.

9. A seal arrangement according to claim 2, wherein said at least one RFID means are operable in an active mode and/or a passive mode.

10. A seal arrangement according to claim 2, wherein each of said at least one RFID means is arranged to perform a specific function, and said specific function differs from that of each of the other said RFID means.

11. A seal arrangement according to claim 2, wherein said at least one RFID means comprise corresponding transceiver antennae.

12. A seal arrangement according claim 11, wherein said transceiver antennae operate at different frequencies to avoid interfering with each other.

13. A seal arrangement according to claim 11, wherein said transceiver antennae comprise dipole aerials.

14. A seal arrangement according to claim 1, wherein said seal portion is formed as a sheet-like member.

15. A seal arrangement according to claim 14, wherein said sheet-like member is formed with an aperture.

16. A seal arrangement according to claim 15, wherein said sheet-like member is an annulus.

17. A seal arrangement according to claim 14, wherein said sheet-like member is formed as a disc.

18. A seal arrangement according to claim 14, wherein said at least one detection means are mounted on a flat-section of said sheet-like member.

19. A seal arrangement according to claim 14, wherein said at least one detection means are mounted on a side surface of said sheet-like member.

20. A seal arrangement according to claim 1, wherein said at least one of said at least one detection means comprises a frangible material provided on a surface of said seal portion, said frangible material being arranged to break if the seal is tampered with.

21. A seal arrangement according to claim 20, wherein said frangible portion comprises at least one track of conductive material arranged to form at least one separate circuit.

22. A seal arrangement according to claim 21, wherein a plurality of said tracks of conductive material are arranged in concentric rings.

23. A seal arrangement according to claim 20, wherein said frangible portion comprises one or more membranes arranged parallel with one another.

24. A seal arrangement according to claim 20, wherein when said frangible portion is broken, said at least one detection means are arranged to no longer output a signal to said at least one determining means, and said at least one determining means determine that the seal has been tampered with.

25. A seal arrangement according to claim 20, wherein when said frangible portion is broken, said at least one detection means are arranged to output a signal to said at least one determining means, and said at least one determining means determine that the seal has been tampered with.

26. A seal arrangement according to claim 20, wherein when said frangible portion is broken, said at least one detection means are arranged to output a signal which is different to a normal signal to said at least one determining means, and said at least one determining means determine that the seal has been tampered with.

27. A seal arrangement according to claim 1, wherein said at least one detection means comprise discrete components mounted upon said seal portion.

28. A seal arrangement according to claim 1, wherein at least one of said at least one detection means comprise a gas sensor for detecting the presence of unwanted gases in the vicinity of said seal.

29. A seal arrangement according to claim 1, wherein at least one of said at least one detection means comprise a temperature sensor for detecting changes in temperature in the vicinity of said seal.

30. A seal arrangement according to claim 1, wherein at least one of said at least one detection means comprise a radiation sensor for detecting if said seal has been subject to radiation.

31. A seal arrangement according to claim 1, wherein at least one of said at least one detection means comprise a sensor arranged to detect for physical changes in the seal brought about by physical changes in a product stored in the vicinity of said seal.

32. A seal arrangement according to claim 1, wherein at least one of said at least one detection means comprise a sensor arranged to detect for chemical changes in the seal brought about by chemical changes in a product stored in the vicinity of said seal.

33. A seal arrangement according to claim 1, wherein at least one of said at least one detection means comprise a sensor arranged to detect for biological changes in the seal brought about by biological changes in a product stored in the vicinity of said seal.

34. A seal arrangement according to claim 1, wherein at least one of said at least one detection means comprise a detector which is arranged to detect changes in the voltage of a circuit formed by said detector means.

35. A seal arrangement according to claim 1, wherein at least one of said at least one detection means comprise a detector which is arranged to detect changes in the resistance of a circuit formed by said detector means.

36. A seal arrangement according to claim 1, wherein at least one of said at least one detection means comprise a detector which is arranged to detect changes in the current of a circuit formed by said detector means.

37. A seal arrangement according to claim 1, wherein at least one of said at least one detection means comprise a detector which is arranged to detect changes in the capacitance of a circuit formed by said detector means.

38. A seal arrangement according to claim 1, wherein at least one of said at least one detection means comprise a detector which is arranged to detect changes in the inductance of a circuit formed by said detector means.

39. A seal arrangement according to claim 1, wherein at least one of said at least one detection means comprise a detector which is arranged to detect changes in the electromagnetic interference of a circuit formed by said detector means.

40. A seal arrangement according to claim 1, wherein at least one of said at least one detection means comprise a detector which is arranged to detect changes in the magnetic field of a circuit formed by said detector means.

41. A seal arrangement according to claim 1, wherein the change in geometric state comprises deflection of the seal.

42. A seal arrangement according to claim 1, wherein the change in geometric state comprises stretching of the seal.

43. A seal arrangement according to claim 1, wherein the change in geometric state comprises shrinkage of the seal.

44. A seal arrangement according to claim 1, wherein the change in geometric state comprises expansion of the seal.

45. A seal arrangement according to claim 1, wherein the change in geometric state comprises contraction of the seal.

46. A seal arrangement according to claim 1, wherein the components of said monitoring means are provided on a single package.

47. A seal arrangement according to claim 1, wherein the components of said monitoring means are provided on a plurality of packages and said packages are interlinked by means allowing communication between said components.

48. A seal arrangement according to claim 1, wherein the components of said monitoring means are provided on at least one package, and wherein said package(s) comprise laminates.

49. A seal arrangement according claim 48, wherein said laminates comprise printed circuits.

50. A seal arrangement according to claim 1, wherein said seal portion is formed entirely of material forming said detector means.

51. A seal arrangement according to claim 1, wherein said seal arrangement is a gasket member.

52. A container comprising:
a main body for storing a product and having an opening to allow access to said product;

a closure member for covering said opening and arranged to be moveable between an open position and a closed position; and a seal arrangement according to claim 1 arranged such that when said closure is in said closed position, said seal is located between said main body and said closure member.

53. A container according to claim 52, wherein said seal arrangement is attached to said closure means by securing means.

54. A container according to claim 53, wherein said securing means comprises an adhesive.

55. A container according to claim 53, wherein said securing means comprises mechanical means.

56. A container according to claim 55, wherein said mechanical means comprise pins.

57. A container according to claim 52, wherein said seal arrangement is held in place between said main body and said closure means by means of the forces exerted by the main body on the closure means and vice versa.

58. A container according to claim 52, wherein said container is further provided with a gasket arranged for location between said seal arrangement and said main body when said closure means is in said closed position.

59. A container according to claim 52, wherein said seal arrangement is embedded in said closure means.

60. A container according to claim 52, wherein said seal arrangement is formed in the material of the closure means.

61. A pipe section for use in a pipeline comprised of a plurality of connected pipe sections, said pipe section comprising a seal arrangement according to claim 1 mounted at one end thereof.

62. A pipeline comprising a plurality of connected pipe sections according to claim 61, wherein said seal arrangements are coupled to each other by electronic means.

63. A pipeline according to claim 62, wherein the seal arrangements are coupled to each other by a combination of electronic and optical means.

64. A pipeline according to claim 62, wherein the seal arrangements in a first section of pipeline comprising at least one pipe section are linked to the seal arrangements in a second section of pipeline comprising at least one pipe section by a radio link.

65. A pipeline comprising a plurality of connected pipe sections according to claim 61, wherein said seal arrangements are coupled to each other by optical means.

66. A closure means for engagement with a container, said closure means comprising means for engaging with said container and a seal arrangement according to claim 1 embedded within said closure means.

67. A closure means for engagement with a container, said closure means comprising means for engaging with said container and a seal arrangement according to claim 1 in the material of the closure means.

68. A container comprising:
a main body for storing a product and having an opening to allow access to said product;
a closure arranged to be moveable between an open position and a closed position; and
a seal arrangement arranged such that when said closure is in said closed position, said seal arrangement is located between said main body and said closure, said seal arrangement comprising monitoring means and a seal portion, said monitoring means comprising at least one means for determining the integrity of said seal portion, said determining means being arranged to provide a signal for at least one radio frequency identification (RFID) means for producing an output signal in response to the integrity of the seal portion as determined by the said means for determining.

69. A pipe section for use in a pipeline comprised of a plurality of connected pipe sections, said pipe section comprising a seal arrangement comprising monitoring means and a seal portion, said monitoring means comprising at least one means for determining the integrity of said seal portion, said determining means being arranged to provide a signal for at least one radio frequency identification (RFID) means for producing an output signal in response to the integrity of the seal portion as determined by the said means for determining.

* * * * *